United States Patent
Otsuka et al.

(10) Patent No.: US 11,267,706 B2
(45) Date of Patent: Mar. 8, 2022

(54) HEXAGONAL BORON NITRIDE POWDER, METHOD FOR PRODUCING SAME, RESIN COMPOSITION AND RESIN SHEET

(71) Applicant: SHOWA DENKO K.K., Tokyo (JP)

(72) Inventors: Yuki Otsuka, Kawasaki (JP); Masaru Fukasawa, Shiojiri (JP)

(73) Assignee: SHOWA DENKO K.K., Tokyo (JP)

( * ) Notice: Subject to any disclaimer, the term of this patent is extended or adjusted under 35 U.S.C. 154(b) by 162 days.

(21) Appl. No.: 16/474,284

(22) PCT Filed: Dec. 21, 2017

(86) PCT No.: PCT/JP2017/045858
§ 371 (c)(1),
(2) Date: Jun. 27, 2019

(87) PCT Pub. No.: WO2018/123788
PCT Pub. Date: Jul. 5, 2018

(65) Prior Publication Data
US 2019/0337803 A1    Nov. 7, 2019

(30) Foreign Application Priority Data
Dec. 28, 2016   (JP) .............................. JP2016-255955

(51) Int. Cl.
*C01B 21/064*   (2006.01)
*C01B 35/12*    (2006.01)
(Continued)

(52) U.S. Cl.
CPC ............ *C01B 21/064* (2013.01); *C01B 32/20* (2017.08); *C01B 32/991* (2017.08); *C01B 35/12* (2013.01);
(Continued)

(58) Field of Classification Search
CPC .................................................. C01B 21/064
See application file for complete search history.

(56) References Cited

U.S. PATENT DOCUMENTS

| 6,048,511 A * | 4/2000 | Shaffer | ............... C04B 35/5831 |
|              |        |         | 264/117 |
| 10,781,352 B2 * | 9/2020 | Otsuka | ..................... C08K 7/00 |

(Continued)

FOREIGN PATENT DOCUMENTS

CN    106882771 A    6/2017
JP    61-286207 A    12/1986
(Continued)

OTHER PUBLICATIONS

Fukasawa etc. Machine translatin of WO2016092951, publication date Jun. 16, 2016.*

(Continued)

*Primary Examiner* — Jun Li
(74) *Attorney, Agent, or Firm* — Sughrue Mion, PLLC

(57) ABSTRACT

An hBN powder containing an aggregate of primary particles of hBN, the hBN powder having a ratio of an average longer diameter $(L_1)$ to an average thickness $(d_1)$ of the primary particles, $[L_1/d_1]$, of 10 to 25, a tap density of 0.80 g/cm$^3$ or more, and a BET specific surface area of less than 5.0 m$^2$/g, in which a particle size distribution curve showing a frequency distribution based on volume of the hBN powder is a bimodal distribution curve having a first peak and a second peak in a range of a particle size of 500 μm or less and having a peak height ratio of a second peak height $(H_B)$ to a first peak height $(H_A)$, $[(H_B)/(H_A)]$, of 0.90 or less, a method for producing the same, and a resin composition and a resin sheet each comprising the hBN powder.

8 Claims, 4 Drawing Sheets

(51) Int. Cl.
*C01B 32/20* (2017.01)
*C01B 32/991* (2017.01)
*C04B 35/583* (2006.01)

(52) U.S. Cl.
CPC ........ *C04B 35/583* (2013.01); *C01P 2002/70* (2013.01); *C01P 2004/03* (2013.01); *C01P 2004/45* (2013.01); *C01P 2004/50* (2013.01); *C01P 2004/53* (2013.01); *C01P 2004/54* (2013.01); *C01P 2006/11* (2013.01); *C01P 2006/12* (2013.01); *C01P 2006/80* (2013.01)

(56) References Cited

U.S. PATENT DOCUMENTS

| | | | | |
|---|---|---|---|---|
| 2004/0076572 | A1* | 4/2004 | Clere | B29C 48/022 423/290 |
| 2012/0196128 | A1* | 8/2012 | Gohara | C01B 21/064 428/402 |
| 2018/0201818 | A1* | 7/2018 | Otsuka | C08K 3/38 |
| 2020/0216738 | A1* | 7/2020 | Fukasawa | C09K 5/14 |
| 2020/0277189 | A1* | 9/2020 | Thendie | C08L 101/12 |

FOREIGN PATENT DOCUMENTS

| | | | | |
|---|---|---|---|---|
| JP | 05-085482 | B2 | 12/1993 | |
| JP | 3461651 | B2 | 10/2003 | |
| JP | 2005-343728 | A | 12/2005 | |
| JP | 2011-098882 | A | 5/2011 | |
| JP | 4750220 | B2 | 8/2011 | |
| JP | 5081488 | B2 | 11/2012 | |
| JP | 2015212217 | A * | 11/2015 | .......... C01B 21/064 |
| JP | 2016-060661 | A | 4/2016 | |
| JP | 2016-108457 | A | 6/2016 | |
| WO | 2016/092951 | A1 | 6/2016 | |
| WO | 2016/092952 | A1 | 6/2016 | |

OTHER PUBLICATIONS

Bulk Density and Tapped Density of Powders, by world health organization, Mar. 2012.*
Machine translation of JP2015212217 description, publication date Nov. 26, 2015.*
Communication dated Sep. 29, 2020 from the Japanese Patent Office in Application No. JP 2016-255955.
International Search Report for PCT/JP2017/045858 dated Mar. 9, 2018 [PCT/ISA/210].
Written Opinion for PCT/JP2017/045858 dated Mar. 9, 2018 [PCT/ISA/237].

* cited by examiner

[Fig. 1]
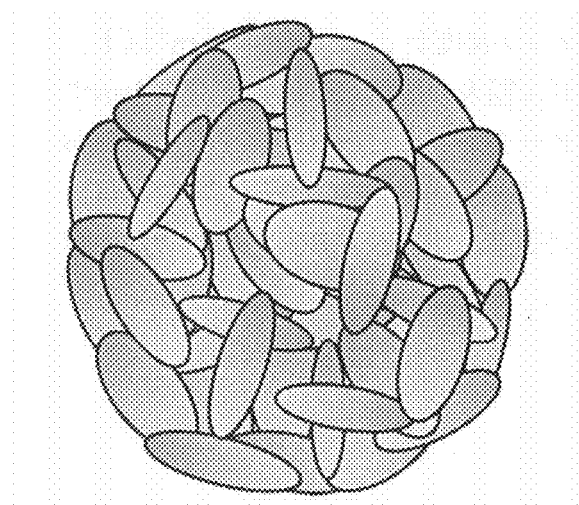
[Fig. 2]
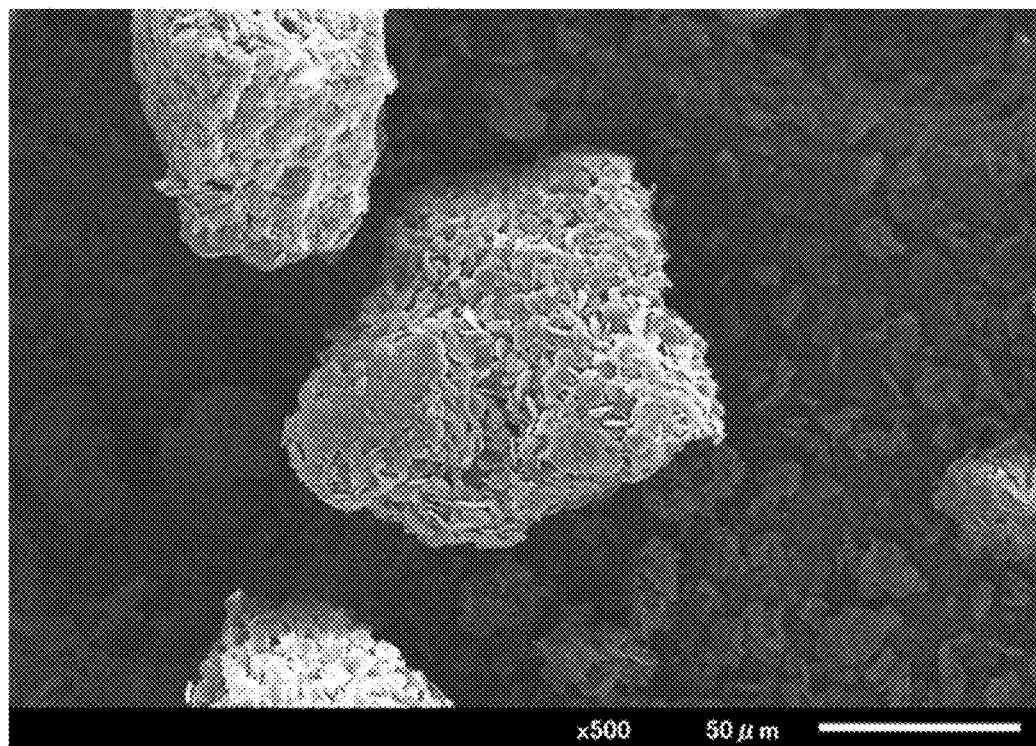

[Fig. 3]
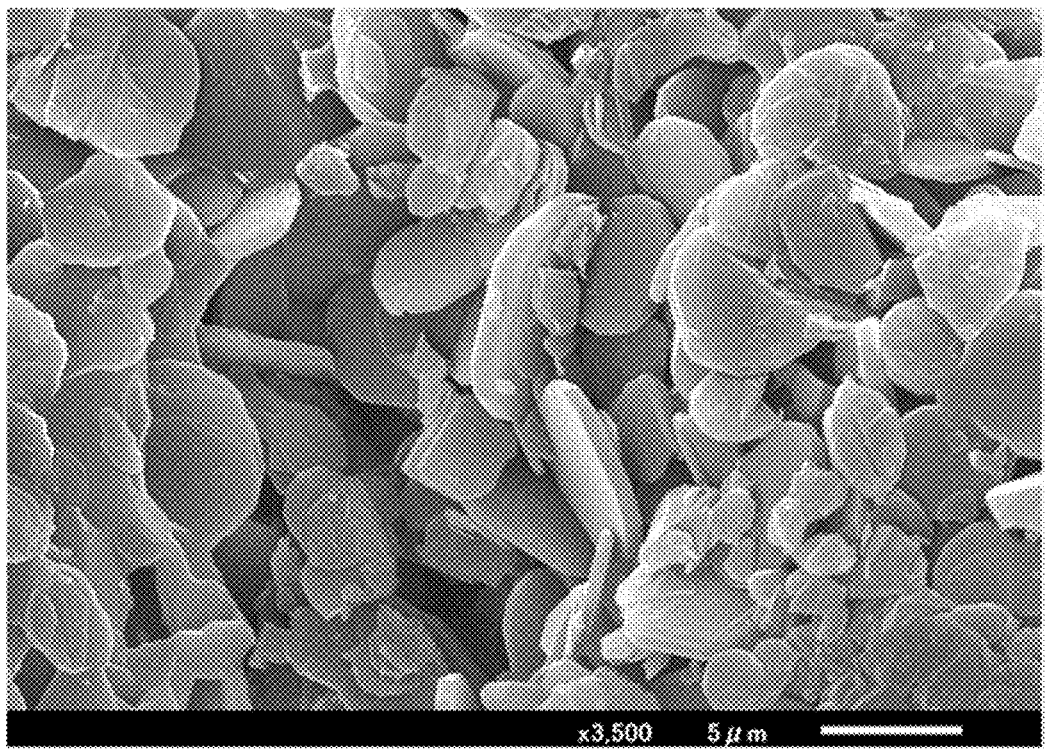
[Fig. 4]
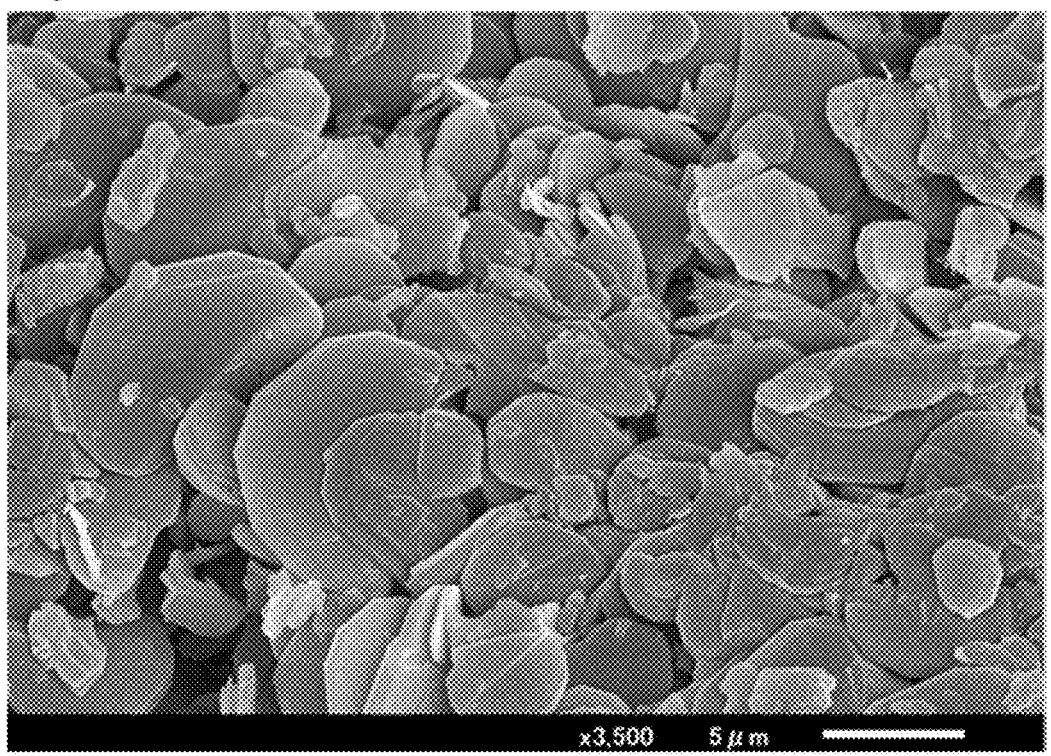

[Fig. 5]
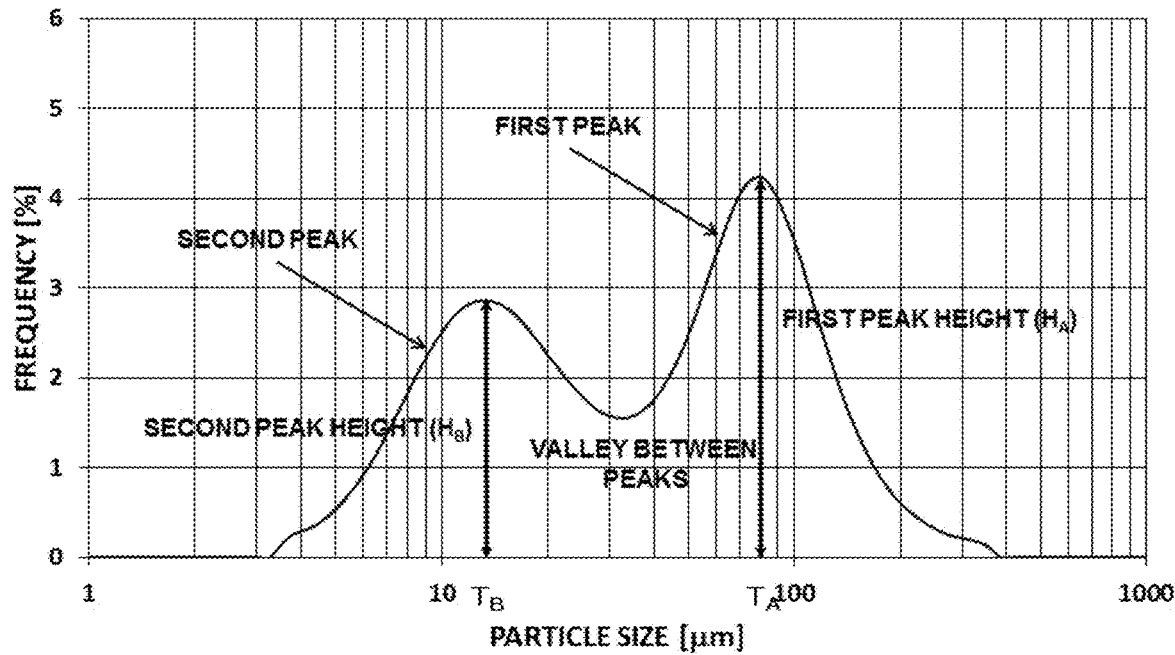
[Fig. 6]
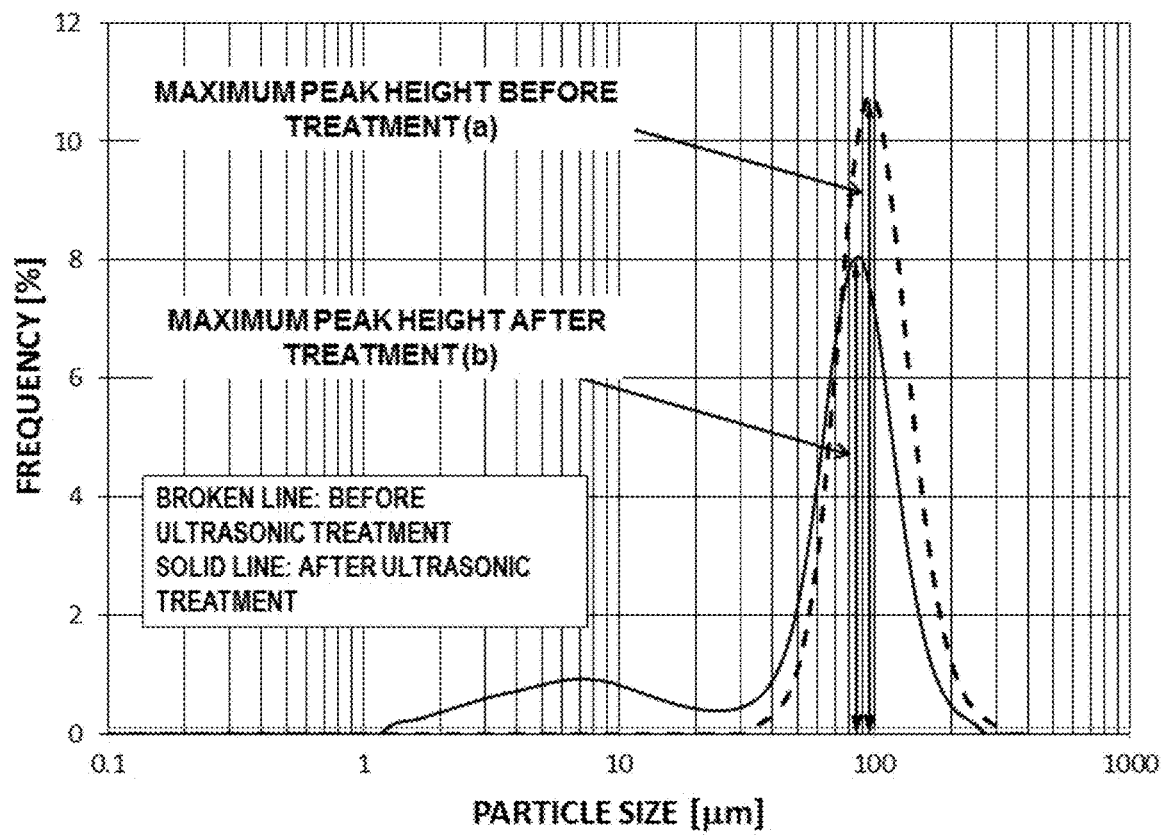

[Fig. 7]
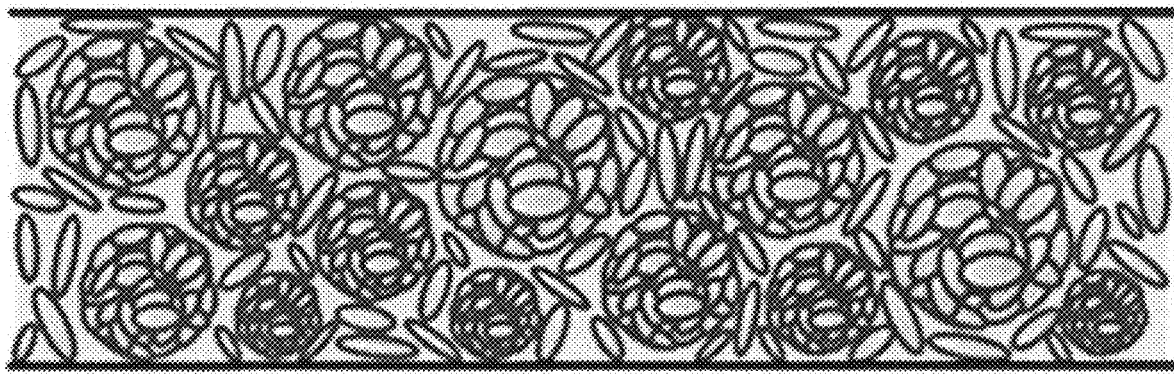

HEXAGONAL BORON NITRIDE POWDER, METHOD FOR PRODUCING SAME, RESIN COMPOSITION AND RESIN SHEET

CROSS REFERENCE TO RELATED APPLICATIONS

This application is a National Stage of International Application No. PCT/JP2017/045858 filed Dec. 21, 2017, claiming priority based on Japanese Patent Application No. 2016-255955 filed Dec. 28, 2016.

TECHNICAL FIELD

The present invention relates to a hexagonal boron nitride (hereinafter, also simply referred to as "hBN") powder, a method for producing the same, and a resin composition and a resin sheet each comprising the hBN powder and particularly relates to a high-purity hBN powder comprising an aggregate comprising primary particles of hBN (hereinafter, also simply referred to as "aggregate"), a method for producing the same, and a resin composition and a resin sheet each comprising the hBN powder.

BACKGROUND ART

An hBN particle has a layered structure similar to that of graphite, has excellent properties such as thermal conductive properties, electric insulation, chemical stability, lubricating properties as a solid, and thermal shock resistance, and therefore is used as an insulation/heat dissipation material, a solid lubricant, solid mold release agent, a raw material for producing an hBN sintered body, and the like taking advantage of these properties.

Conventionally, the hBN powder has generally been obtained by mixing a boron compound such as boric acid or borax and a nitrogen compound such as melamine or urea, then firing the resultant mixture at a relatively low temperature under an ammonia atmosphere or a non-oxidizing gas atmosphere to produce a crude hBN powder having a low crystallinity, and subsequently firing the obtained crude hBN powder at a high temperature under a non-oxidizing gas atmosphere to allow the crystals to grow (PTLs 1 to 3).

A sheet, tape, grease, or the like in which such an hBN powder is contained as a filler in a resin material such as an epoxy resin, silicone rubber, or the like is used as a thermally conductive member, such as, for example, a thermally conductive sheet or thermally conductive grease having electric insulation, for effectively dissipating heat generated from an electronic component. To further improve the thermal conductive properties of these thermally conductive members, attempts to increase the filling rate of the hBN powder in the thermally conductive members are being made.

In recent years, a method for mixing the hBN powder comprising secondary particles (aggregate) in which primary particles of hBN aggregate with a resin has been used for the purpose of improving the filling rate of the hBN powder and suppressing orientation anisotropy in a thermally conductive sheet (PTLs 4, 5) However, when the strength of the aggregate is not sufficient, there is a problem that the aggregate disintegrates in a process of forming a composite with the resin, so that the orientation anisotropy occurs in the thermally conductive sheet and the filling rate of the hBN powder in the thermally conductive sheet cannot be increased sufficiently because the disintegration of the aggregate needs to be prevented, thereby lowering the thermal conductive properties.

Thus, attempts to obtain the hBN powder by subjecting boron carbide to nitriding treatment under a condition of 1800° C. or more in a nitrogen atmosphere, then mixing a resultant product with diboron trioxide or a precursor thereof, thereafter firing the resultant mixture, and removing a carbon component after that have been made for the purpose of improving the filling rate of the hBN powder in a thermally conductive sheet and improving the thermal conductive properties (PTLs 6, 7).

CITATION LIST

Patent Literature

PTL1: JP 61-286207 A
PTL2: JP 3461651 B
PTL3: JP 5-85482 B
PTL4: JP 2011-098882 A
PTL5: JP 2005-343728 A
PTL6: JP 4750220 B
PTL7: JP 5081488 B

SUMMARY OF INVENTION

Technical Problem

The primary particle of hBN generally has a scale-like particle shape, and it is advantageous for improving the electric insulation that the ratio of the average longer diameter to the average thickness of the primary particles (average longer diameter/average thickness) is large. However, when the filling rate of the hBN powder comprising the primary particles of hBN which have a large ratio of the average longer diameter to the average thickness is increased, the primary particles easily face in a constant direction and the orientation anisotropy easily occurs in properties of a molded article, such as a thermally conductive sheet, obtained by molding a resin composition comprising the hBN powder. When such orientation anisotropy occurs, the properties such as the thermal conductive properties and the electric insulation are lowered.

Moreover, the reaction rate for forming boron nitride from boron carbide is very slow, and therefore there is a problem that the reaction requires a long time in a method involving reacting only boron carbide with nitrogen, thereby increasing production cost, and the thermal conductive properties and electric insulation of the hBN powder obtained by the production method are still insufficient and therefore further improvement has been desired.

The present invention intends to provide a high-purity hBN powder comprising an aggregate comprising primary particles of hBN which have a large ratio of an average longer diameter to an average thickness, the hBN powder having superior thermal conductive properties and electric insulation than conventional hBN powders when used in a resin composition or a resin sheet, a method for producing the same, and a resin composition and a resin sheet each comprising the hBN powder.

Solution to Problem

The present inventors have conducted diligent studies to find that the problems can be solved by an hBN powder comprising an aggregate of primary particles of hBN, wherein the powder has a ratio of an average longer diameter ($L_1$) to an average thickness ($d_1$) of the primary particles, [$L_1/d_1$], a tap density, and a BET specific surface area in a particular range, and a particle size distribution curve of the hBN powder is a bimodal distribution curve having a particular shape in a range of a particle size of 500 μm or less.

The present invention is based on the above-described finding.

That is, the present invention provides the following [1] to [10].

[1] A hexagonal boron nitride powder comprising an aggregate of primary particles of hexagonal boron nitride and having a ratio of an average longer diameter ($L_1$) to an average thickness ($d_1$) of the primary particles, [$L_1/d_1$], of 10 or more and 25 or less, a tap density of 0.80 g/cm$^3$ or more, and a BET specific surface area of less than 5.0 m$^2$/g, wherein a particle size distribution curve showing a frequency distribution based on volume of the hexagonal boron nitride powder is a bimodal distribution curve having a first peak in a range of a particle size of 500 μm or less and a second peak existing on a smaller particle size side of the first peak and has a peak height ratio of a height of the second peak ($H_B$) to a height of the first peak ($H_A$), [($H_B$)/($H_A$)], of 0.90 or less.

[2] The hexagonal boron nitride powder according to [1], wherein the powder has one maximum peak in a range of a particle size of 45 μm or more and 150 μm or less in a particle size distribution curve showing a frequency distribution based on volume of a hexagonal boron nitride powder classified to have a particle size of 45 μm or more and 95 μm or less, and has a decrease rate of the maximum peak of 35% or more and 70% or less when a dispersion liquid obtained by dispersing the classified hexagonal boron nitride powder in water is subjected to an ultrasonic treatment for 1 minute, the peak decrease rate being calculated by the following expression (1):

Peak decrease rate=[(maximum peak height before treatment ($a$))−(maximum peak height after treatment ($b$))]×100/(maximum peak height before treatment ($a$))     (1).

[3] The hexagonal boron nitride powder according to [1] or [2], having a crystallite size of 260 Å or more and 1000 Å or less.

[4] The hexagonal boron nitride powder according to any one of [1] to [3], wherein the average longer diameter ($L_1$) of the primary particles is 0.5 μm or more and 20 μm or less.

[5] A resin composition comprising 10% by volume or more and 90% by volume or less of the hexagonal boron nitride powder according to any one of [1] to [4].

[6] A resin sheet comprising the resin composition according to [5] or a cured product thereof.

[7] A method for producing the hexagonal boron nitride powder according to any one of [1] to [4], the method comprising a step of mixing 100 parts by mass of a mixed powder comprising 50% by mass or more and 90% by mass or less of a boron nitride fine powder (A) and 10% by mass or more and 50% by mass or less of a boron compound (B) represented by a composition formula $B_2O_{(3+X)}H_{2X}$ wherein X=0 to 3, 1.0 part by mass or more and 20 parts by mass or less in terms of carbon of a carbon source (C), and 0.01 parts by mass or more and 5.0 parts by mass or less of a calcium compound (D), molding a resultant mixture, and then firing a resultant mixture under an atmosphere comprising a nitrogen gas, wherein the boron nitride fine powder (A) has a ratio of an average longer diameter ($L_2$) to an average thickness ($d_2$) of primary particles thereof, [$L_2/d_2$], of 2.0 or more and 15 or less, a 50% volume cumulative particle size $D_{50}$ of 0.20 μm or more and 5.0 μm or less, a BET specific surface area of 5.0 m$^2$/g or more and 30 m$^2$/g or less, and a crystallite size of 150 Å or more and 400 Å or less.

[8] The method for producing the hexagonal boron nitride powder according to [7], wherein the carbon source (C) is at least one selected from the group consisting of graphite and boron carbide.

[9] The method for producing the hexagonal boron nitride powder according to [7] or [8], wherein the carbon source (C) is boron carbide, and the boron carbide has a 50% volume cumulative particle size $D_{50}$ of 1.0 μm or more and 200 μm or less.

[10] A method for producing a classified hexagonal boron nitride powder obtained by further classifying the hexagonal boron nitride powder obtained by the production method according to any one of [7] to [9], wherein a particle size distribution curve showing a frequency distribution based on volume of the classified hexagonal boron nitride powder is a monomodal distribution curve having a maximum peak in a range of a particle size of 500 μm or less.

Advantageous Effects of Invention

According to the present invention, a high-purity hBN powder comprising an aggregate comprising primary particles of hBN which have a large ratio of an average longer diameter ($L_1$) to an average thickness ($d_1$), [$L_1/d_1$], the hBN powder having superior thermal conductive properties and electric insulation than conventional hBN powders when used in a resin composition or a resin sheet, a method for producing the same, and a resin composition and a resin sheet each comprising the hBN powder can be provided.

BRIEF DESCRIPTION OF DRAWINGS

FIG. 1 is a schematic diagram of an aggregate of primary particles of hBN according to the present invention.

FIG. 2 is an SEM image of an aggregate of primary particles of hBN obtained in Example 1.

FIG. 3 is an enlarged SEM image of an aggregate of primary particles of hBN obtained in Example 1.

FIG. 4 is an enlarged SEM image of an aggregate of primary particles of hBN obtained in Comparative Example 1.

FIG. 5 is a graph showing a particle size distribution curve of Example 1.

FIG. 6 is a reference graph showing a particle size distribution curve before and after ultrasonic treatment for use in calculation of a peak decrease rate according to the present invention.

FIG. 7 is a schematic diagram of a resin sheet comprising a hexagonal boron nitride powder according to the present invention.

DESCRIPTION OF EMBODIMENTS

{Hexagonal Boron Nitride Powder}

The hexagonal boron nitride (hBN) powder according to the present invention is a hexagonal boron nitride powder comprising an aggregate of primary particles of hBN, wherein the powder has a ratio of an average longer diameter ($L_1$) to an average thickness ($d_1$) of the primary particles, [$L_1/d_1$], of 10 or more and 25 or less, a tap density of 0.80 g/cm$^3$ or more, and a BET specific surface area of less than 5.0 m$^2$/g, a particle size distribution curve showing a frequency distribution based on volume of the hBN powder is a bimodal distribution curve having a first peak in a range of a particle size of 500 μm or less and a second peak existing on a smaller particle size side of the first peak, and has a peak height ratio of a height of the second peak ($H_B$) to a height of the first peak ($H_A$), [($H_B$)/($H_A$)], of 0.90 or less.

In the present specification, the "average longer diameter" means a number average value of the longer diameters of the primary particles, and the "average thickness" means a number average value of the thicknesses of the primary particles. In addition, the "longer diameter" means the maximum diameter in a planar direction of a scale-like particle.

In addition, the "height of a peak" means a value of a frequency (%) at the peak in a particle size distribution curve showing a frequency distribution based on volume of a powder. Moreover, the value of the frequency at the peak corresponds to the number of particles, and a higher frequency at the peak means that the number of particles having a particle size corresponding to the peak is larger.

According to the present invention, a high-purity hBN powder comprising an aggregate comprising primary particles of hBN which have a large ratio of an average longer diameter ($L_1$) to an average thickness ($d_1$), [$L_1/d_1$], the hBN powder having thermal conductive properties and electric insulation superior to conventional hBN powders when used in a resin composition or a resin sheet can be obtained. The reason that such an effect is obtained is not clear but is considered as follows.

Generally, when the ratio of the average longer diameter to the average thickness of the primary particles of the hBN powder is large, the interaction between primary particles is lowered and the strength of the aggregate is lowered to make it difficult to maintain the granular shape, so that the primary particles easily orientates. Therefore, the thermal conductive properties are lowered even though the orientation is advantageous for improving the electric insulation. However, in the hBN powder according to the present invention, the particle size distribution curve is a bimodal distribution curve having a first peak existing on a larger particle size side in a range of a particle size of 500 μm or less and a second peak existing on a smaller particle size side of the first peak, and the frequency on the larger particle size side is high, namely the content of the hBN powder having a larger particle size is large, because the peak height ratio of the height of the second peak ($H_B$) to the height of the first peak ($H_A$), [($H_B$)/($H_A$)], is 0.90 or less. Further, it is considered that the aggregate can maintain a dense granular shape without disintegrating because the tap density is high, and the BET specific surface area is low. Therefore, it is considered that the primary particles of hBN can maintain random orientation in the obtained resin sheet even though the aggregate comprising primary particles having a large ratio of the average longer diameter to the average thickness is contained, and further, both the excellent thermal conductive properties and the excellent electric insulation can be achieved because the amount of the resin which is taken in the granules is reduced.

However, these are estimates, and the present invention is not limited to these mechanisms.

<Primary Particles>

The average longer diameter ($L_1$) of the primary particles of the hBN powder according to the present invention is preferably 0.5 μm or more and 20 μm or less, more preferably 0.5 μm or more and 18 μm or less, still more preferably 1.0 μm or more and 16 μm or less, further still more preferably 3.0 μm or more and 14 μm or less, further still more preferably 4.0 μm or more and 12 μm or less, further still more preferably 5.0 μm or more and 10 μm or less, and further still more preferably 6.0 μm or more and 8.0 μm or less from the viewpoint of improvements in the thermal conductive properties and the electric insulation.

It is to be noted that the average longer diameter ($L_1$) of the primary particles is a number average value of the longer diameters of the primary particles and is measured by the method described in Examples.

The ratio of the average longer diameter ($L_1$) to the average thickness ($d_1$) of the primary particles, [$L_1/d_1$] (hereinafter, also simply referred to as "ratio [$L_1/d_1$]"), in the hBN powder according to the present invention is 10 or more and 25 or less, preferably 11 or more and 23 or less, more preferably 12 or more and 20 or less, still more preferably 13 or more and 18 or less, further still more preferably 14 or more and 17 or less, and further still more preferably 14.5 or more and 17.5 or less from the viewpoint of improvements in the thermal conductive properties and the electric insulation.

It is to be noted that the ratio [$L_1/d_1$] of the primary particles contained in the hBN powder is measured by the method described in Examples.

<hBN Powder>

The tap density of the hBN powder according to the present invention is 0.80 g/cm$^3$ or more, preferably 0.81 g/cm$^3$ or more, more preferably 0.82 g/cm$^3$ or more, still more preferably 0.83 g/cm$^3$ or more, further still more preferably 0.84 g/cm$^3$ or more, and further still more preferably 0.85 g/cm$^3$ or more from the viewpoint of improving the strength of the aggregate and improving the thermal conductive properties and the electric insulation. Moreover, the tap density of the hBN powder is preferably 1.9 g/cm$^3$ or less.

It is to be noted that the tap density of the hBN powder is measured by the method described in Examples.

The BET specific surface area of the hBN powder according to the present invention is less than 5.0 m$^2$/g, preferably 1.0 m$^2$/g or more and 4.8 m$^2$/g or less, more preferably 2.0 m$^2$/g or more and 4.6 m$^2$/g or less, still more preferably 3.0 m$^2$/g or more and 4.4 m$^2$/g or less, further still more preferably 3.5 m$^2$/g or more and 4.3 m$^2$/g or less, and further still more preferably 4.0 m$^2$/g or more and 4.3 m$^2$/g or less from the viewpoint of improvements in the thermal conductive properties and the electric insulation.

When the BET specific surface area is less than 5 m$^2$/g, the specific surface area of the aggregate contained in the hBN powder is also small and the amount of a resin component to be taken in the aggregate in producing a resin composition can be reduced. Therefore, it is considered that the thermal conductive properties and the electric insulation are improved because the amount of the resin component existing between the aggregates becomes relatively large to improve the dispersibility of the aggregates to the resin component, so that the hBN powder and the resin component become well blended.

It is to be noted that the BET specific surface area of the hBN powder is measured by the BET one-point method utilizing the fluid process described in Examples.

The particle size distribution curve showing the frequency distribution based on volume of the hBN powder according to the present invention is a bimodal distribution curve having a first peak in a range of a particle size of 500 μm or less and a second peak existing in the smaller particle size side of the first peak and has a peak height ratio of the height of the second peak ($H_B$) to the height of the first peak ($H_A$), [($H_B$)/($H_A$)] (hereinafter, also simply referred to as "peak height ratio [($H_B$)/($H_A$)]") of 0.90 or less, preferably 0.10 or more and 0.90 or less, more preferably 0.30 or more and 0.87 or less, still more preferably 0.50 or more and 0.85 or less, further preferably 0.60 or more and 0.83 or less, and further still more preferably 0.70 or more and 0.80 or less from the viewpoint of improvements in the thermal conductive properties and the electric insulation. The particle size distribution curve is obtained, for example, using a particle size distribution analyzer [manufactured by NIK-KISO CO., LTD., model name "Microtrac MT3300EX II"] of a laser diffraction scattering method, and in a particle size distribution curve in which the frequency is shown by a fraction based on volume, a maximum peak existing on the larger particle size side is defined as the first peak and a peak existing on the smaller particle size side of the first peak is defined as the second peak to derive the first peak height ($H_A$) and the second peak height ($H_B$) from the maximum heights of respective peaks and calculate the peak height ratio $[(H_B)/(H_A)]$ from the obtained heights of the first peak and the second peak.

Moreover, when the particle sizes at the maximum height of the first peak and of the second peak in the particle size distribution curve are defined as the particle diameter at the first peak top ($T_A$) and the particle size at the second peak top ($T_B$) respectively, the particle size at the first peak top ($T_A$) is preferably 40 μm or more and 300 μm or less, more preferably 50 μm or more and 200 μm or less, still more preferably 60 μm or more and 100 μm or less, and further still more preferably 65 μm or more and 80 μm or less.

In addition, the particle size of the second peak top ($T_B$) is preferably 5 μm or more and 30 μm or less, more preferably 7 μm or more and 25 μm or less, still more preferably 10 μm or more and 20 μm or less, and further still more preferably 10 μm or more and 15 μm or less.

The difference between the particle sizes at the two peak tops $[(T_A)-(T_B)]$ is preferably 20 μm or more and 100 μm or less, more preferably 30 μm or more and 90 μm or less, still more preferably 40 μm or more and 80 μm or less, and further still more preferably 50 μm or more and 70 μm or less.

Furthermore, when the particle size at the minimum point between the first peak and the second peak in the particle size distribution curve is defined as the particle size at the valley between the peaks, the particle size at the valley between the peaks is preferably 10 μm or more and 60 μm or less, more preferably 20 μm or more and 50 μm or less, and still more preferably 30 μm or more and 40 μm or less.

FIG. 5 is a particle size distribution curve of Example 1 used for deriving the various numerical values.

The hBN powder according to the present invention has one maximum peak in a range of a particle size of 45 μm or more and 150 μm or less in a particle size distribution curve of the hBN powder classified to have a particle size of 45 μm or more and 95 μm or less, and has a decrease rate of the maximum peak of preferably 35% or more and 70% or less when a dispersion liquid obtained by dispersing the classified hBN powder in water is subjected to an ultrasonic treatment for 1 minute, the decrease rate being calculated by the following expression (1):

Peak decrease rate=[(maximum peak height before treatment($a$))−(maximum peak height after treatment($b$))]×100/(maximum peak height before treatment($a$))    (1).

The particle size distribution curve is measured using a particle size distribution analyzer by the laser diffraction scattering method. The lower the peak decrease rate is, the higher the disintegration strength of the hBN powder is, and therefore the peak decrease rate is an index of the disintegration strength of the hBN powder. Accordingly, the disintegration of the aggregate in the process of forming a composite with a resin can be prevented or suppressed by setting the peak decrease rate to 70% or less. In addition, in the case where the hBN powder is used as a resin sheet obtained by molding a resin composition, the moldability is improved and the aggregate deforms moderately in the resin sheet by setting the peak decrease rate to 35% or more. Therefore, it is considered the contact property of the hBN powder being a filler is improved to form a thermal conduction path, so that high thermal conductive properties are exhibited, and further, the hBN primary particles which have disintegrated by the deformation orientate in a planar direction of the resin sheet to form a long electric path in a planar direction, so that the electric insulation is improved.

From these viewpoints, the peak decrease rate of the hBN powder is more preferably 36% or more and 60% or less, still more preferably 36.5% or more and 55% or less, further still more preferably 37% or more and 50% or less, further still more preferably 37.5% or more and 47% or less, and further still more preferably 38% or more and 45% or less.

It is to be note that the peak decrease rate of the hBN powder is measured by the method described in Examples.

In addition, by the hBN powder "classified to have a diameter of 45 μm or more and 95 μm or less" in the present invention, a pre-treatment condition of the hBN powder according to the present invention provided for the measurement of the peak decrease rate is specified, but the hBN powder itself according to the present invention is not specified.

Furthermore, in the particle size distribution curve of the hBN powder classified to have a particle size of 45 μm or more and 95 μm or less, the hBN powder has one maximum peak in a range of a particle size of 45 μm or more and 150 μm or less but may have a maximum peak in a range of a particle size larger than the range, namely in a range of exceeding 95 μm and 150 μm or less. This is because the hBN powder to be classified may pass through a sieve depending on the particle shape, a particle may be counted as a particle having a larger particle size than the actual size, two particles may be counted as one particle, or the longer diameter may be counted assuming that the hBN powder has a spherical shape in counting particles by the laser diffraction scattering method.

The crystallite size of the hBN powder according to the present invention is preferably 260 Å or more and 1000 Å or less, more preferably 280 Å or more and 750 Å or less, still more preferably 300 Å or more and 500 Å or less, and further still more preferably 350 Å or more and 450 Å or less from the viewpoint of improvements in the thermal conductive properties. When the crystallite size is 260 Å or more, the inconsistency of the crystallites can be suppressed, so that high thermal conductive properties are exhibited. In addition, when the crystallite size is 1000 Å or less, the anisotropy of the thermal conductive properties can be suppressed.

It is to be noted that the crystallite size is measured by the method described in Examples.

The hBN powder according to the present invention comprises the aggregate, and therefore the aggregate can maintain the granular shape without disintegrating and the orientation of the primary particles in a constant direction is prevented or suppressed even though the filling rate of the hBN powder in a resin composition is increased. Therefore, a resin composition and a resin sheet each having excellent thermal conductive properties and electric insulation can be obtained by using the hBN powder.

The purity of the hBN powder according to the present invention, namely the purity of hBN in the hBN powder according to the present invention is preferably 96% by mass or more, more preferably 98% by mass or more, still more preferably 99% by mass or more, further still more preferably 99.5% by mass or more, and further still more preferably 99.8% by mass or more from the viewpoint of improvements in the thermal conductive properties.

It is to be noted that the purity of the hBN powder can be measured by the method described in Examples.

The content of boron oxide (hereinafter, also simply referred to as "$B_2O_3$ content") in the hBN powder according to the present invention is preferably 0.001% by mass or more and 0.120% by mass or less, more preferably 0.005% by mass or more and 0.110% by mass or less, still more preferably 0.008% by mass or more and 0.100% by mass or less, further still more preferably 0.010% by mass or more and 0.080% by mass or less, and further still more preferably 0.020% by mass or more and 0.070% by mass or less from the viewpoint of improvements in the thermal conductive properties and production superiority.

It is to be noted that the $B_2O_3$ content can be measured by the method described in Examples.

The content of calcium oxide (hereinafter, also simply referred to as "CaO content") in the hBN powder according to the present invention is preferably 0.50% by mass or less, more preferably 0.20% by mass or less, still more preferably 0.10% by mass or less, further still more preferably 0.05% by mass or less, further still more preferably 0.04% by mass or less, further still more preferably 0.03% by mass or less, and further still more preferably 0.02% by mass or less from the viewpoint of improvements in the thermal conductive properties. It is to be noted that the content of CaO in the hBN powder can be measured by the method described in Examples.

The content of carbon in the hBN powder according to the present invention is preferably 0.50% by mass or less, more preferably 0.20% by mass or less, still more preferably 0.10% by mass or less, further still more preferably 0.05% by mass or less, further still more preferably 0.04% by mass or less, further still more preferably 0.03% by mass or less, and further still more preferably 0.02% by mass or less from the viewpoint of improvements in the thermal conductive properties and the electric insulation.

It is to be noted that the content of carbon in the hBN powder can be measured by the method described in Examples.

<Surface Treatment>

A surface treatment may be performed as necessary on the hBN powder according to the present invention using various coupling agents or the like for the purpose of enhancing the dispersibility in the resin component and improving the processability in producing a resin composition by dispersing the hBN powder according to the present invention in a resin component.

(Coupling Agent)

Examples of the coupling agent include silane-based, titanate-based, and aluminum-based coupling agents, and among these, silane-based coupling agents are preferable in terms of the effect. As the silane-based coupling agent, aminosilane compounds such as γ-aminopropyltrimethoxysilane, γ-aminopropyltriethoxysilane, γ-(2-aminoethyl) aminopropyltrimethoxysilane, γ-(2-aminoethyl)aminopropyltriethoxysilane, γ-anilinopropyltrimethoxysilane, γ-anilinopropyltriethoxysilane, N-β-(N-vinylbenzylaminoethyl)-γ-aminopropyltrimethoxysilane, and N-β-(N-vinylbenzylaminoethyl)-γ-aminopropyltriethoxysilane are particularly preferably used.

{Method for Producing Hexagonal Boron Nitride Powder}

The hexagonal boron nitride powder (hBN powder) according to the present invention is preferably obtained by a production method comprising a step of mixing 100 parts by mass of a mixed powder comprising 50% by mass or more and 90% by mass or less of a boron nitride fine powder (A) (hereinafter, also simply referred to as "BN fine powder (A)") and 10% by mass or more and 50% by mass or less of a boron compound (B) represented by a composition formula $B_2O_{(3+X)}H_{2X}$ wherein X=0 to 3, 1.0 part by mass or more and 20 parts by mass or less in terms of carbon of a carbon source (C), and 0.01 parts by mass or more and 5.0 parts by mass or less of a calcium compound (D), molding a resultant mixture, and then firing a resultant under an atmosphere comprising a nitrogen gas from the viewpoint of improvements in the thermal conductive properties and the electric insulation.

It is to be noted that with respect to the hBN powder according to the present invention, the hBN powder is preferably obtained by further performing at least one of pulverization or classification after the firing step, and the hBN powder is more preferably obtained by performing both the pulverization and the classification.

Hereinafter, the mixed powder comprising the BN fine powder (A) and the boron compound (B), the carbon source (C), and the calcium compound (D) will be described, and subsequently each step of mixing, molding, firing, pulverization, and classification will be described.

<Mixed Powder>

The mixed powder for use in the production method according to the present invention comprises 50% by mass or more and 90% by mass or less of the BN fine powder (A) and 10% by mass or more and 50% by mass or less of the boron compound (B).

The BN fine powder (A) has a ratio of an average longer diameter ($L_2$) to an average thickness ($d_2$) of primary particles thereof, [$L_2/d_2$] (hereinafter, also simply referred to as "ratio [$L_2/d_2$]"), of 2.0 or more and 15 or less, a 50% volume cumulative particle size $D_{50}$ of 0.20 μm or more and 5.0 μm or less, a BET specific surface area of 5.0 m²/g or more and 30 m²/g or less, and a crystallite size of 150 Å or more and 400 Å or less.

In a molded body obtained from the mixed powder comprising such a BN fine powder (A), the BN particles densely exist, and therefore the particles grow in a state where the BN particles in the molded body are entangled during firing, so that the BN particle comprising a dense and strong aggregate can be obtained. Thereby, the disintegration of the aggregate in the resin composition and the resin sheet described later can be prevented and suppressed, and the thermal conductive properties and electric insulation of the resin composition and the resin sheet can be improved.

The mixed powder is preferably obtained by mixing the BN fine powder (A) and the boron compound (B) so that the content of the BN fine powder (A) can be 50% by mass or more and 90% by mass or less and the content of the boron compound (B)$_{ca}$n be 10% by mass or more and 50% by mass or less.

{Boron Nitride Fine Powder (A)}

The boron nitride fine powder (BN fine powder) (A) has a hexagonal crystal structure, and the ratio [$L_2/d_2$] in the primary particles of the BN fine powder (A) is 2.0 or more and 15 or less, preferably 5.0 or more and 10 or less, more preferably 5.0 or more and 8.0 or less, and still more preferably 5.0 or more and 7.0 or less from the viewpoint of improvements in the thermal conductive properties and the electric insulation.

The 50% volume cumulative particle size $D_{50}$ of the BN fine powder (A) is 0.20 µm or more and 5.0 µm or less, preferably 0.20 µm or more and 4.0 µm or less, more preferably 0.20 µm or more and 3.0 µm or less, still more preferably 0.20 µm or more and 2.0 µm or less, further still more preferably 0.20 µm or more and 1.0 µm or less, further still more preferably 0.25 µm or more and 0.90 µm or less, and further still more preferably 0.30 µm or more and 0.80 µm or less from the viewpoint of improvements in the thermal conductive properties and the electric insulation.

The BET specific surface area of the BN fine powder (A) is 5.0 m²/g or more and 30 m²/g or less, preferably 5.0 m²/g or more and 25 m²/g or less, more preferably 5.0 m²/g or more and 20 m²/g or less, still more preferably 6.0 m²/g or more and 15 m²/g or less, further still more preferably 6.0 m²/g or more and 13 m²/g or less, further still more preferably 7.0 m²/g or more and 12 m²/g or less, further still more preferably 8.0 m²/g or more and 11 m²/g or less, and further still more preferably 8.0 m²/g or more and 10 m²/g or less from the viewpoint of improvements in the thermal conductive properties and the electric insulation. The crystallite size of the BN fine powder (A) is 150 Å or more and 400 Å or less, preferably 180 Å or more and 400 Å or less, more preferably 200 Å or more and 400 Å or less, still more preferably 220 Å or more and 350 Å or less, further still more preferably 230 Å or more and 320 Å or less, and further still more preferably 240 Å or more and 300 Å or less from the viewpoint of improvements in the thermal conductive properties and the electric insulation.

The purity of the BN fine powder (A) is preferably 95% by mass or more, more preferably 97% by mass or more, and still more preferably 99% by mass or more.

It is to be noted that each of the ratio [$L_2/d_2$], 50% volume cumulative particle size $D_{50}$, BET specific surface area, and crystallite size of the BN fine powder (A) is measured by the method described in Examples.

The content of the BN fine powder (A) in the mixed powder is 50% by mass or more and 90% by mass or less. When the content of the BN fine powder (A) in the mixed powder is 50% by mass or more, the hBN powder according to the present invention can be produced in a highly efficient manner by using the mixed powder as a raw material. When the content of the BN fine powder (A) is 90% by mass or less, production can be conducted efficiently while controlling the amount of the BN fine powder (A) to be used. From these viewpoints, the content of the BN fine powder (A) in the mixed powder is preferably 55% by mass or more, more preferably 60% by mass or more, and still more preferably 65% by mass or more and is preferably 85% by mass or less, more preferably 80% by mass or less, still more preferably 75% by mass or less, and further still more preferably 70% by mass or less.

{Boron Compound (B)}

Examples of the boron compound (B) represented by the composition formula $B_2O_{(3+X)}H_{2X}$ wherein X=0 to 3 include at least one selected from the group consisting of oxides of boron including oxo acids of boron such as orthoboric acid ($H_3BO_3$), metaboric acid ($HBO_2$), and tetraboric acid ($H_2B_4O_7$), and boric anhydride ($B_2O_3$). Among others, boric anhydride ($B_2O_3$) is preferable from the viewpoint of an easy availability and a good miscibility with the BN fine powder (A).

The purity of the boron compound (B) is preferably 90% by mass or more, more preferably 95% by mass or ore, still more preferably 99% by mass or more, and further still more preferably 100% by mass.

The content of the boron compound (B) in the mixed powder is 10% by mass or more and 50% by mass or less. When the content of the boron compound (B) in the mixed powder is 10% by mass or more, production can be conducted efficiently while controlling the amount of the BN fine powder (A) to be used. When the content of the boron compound (B) is 50% by mass or less, the hBN powder according to the present invention can be produced in a highly efficient manner. From these viewpoints, the content of the boron compound (B) in the mixed powder is preferably 15% by mass or more, more preferably 20% by mass or more, still more preferably 25% by mass or more, and further still more preferably 30% by mass or more and is preferably 45% by mass or less, more preferably 40% by mass or less, and still more preferably 35% by mass or less.

It is to be noted that the total content of the BN fine powder (A) and the boron compound (B) in the mixed powder is preferably 90% by mass or more, more preferably 95% by mass or more, still more preferably 99% by mass or more, and further still more preferably 100% by mass.

The mixed powder may comprise another component within a range that does not impair the effects of the present invention, and the content of the another component in the mixed powder is preferably 10% by mass or less, more preferably 5% by mass or less, and still more preferably 1% by mass or less, and the mixed powder further still more preferably does not comprise the another component.

<Carbon Source (C)>

In the production method according to the present invention, 1.0 part by mass or more and 20 parts by mass or less in terms of carbon of the carbon source (C) is mixed, based on 100 parts by mass of the mixed powder.

The carbon source (C) for use in the production method according to the present invention is carbon or a carbon-containing compound. Examples of the carbon source (C) for use in the present invention include graphite, carbon black, boron carbide, saccharides, melamine, and phenol resins, and the carbon source is more preferably at least one selected from the group consisting of graphite and boron carbide. Moreover, graphite and boron carbide may be used together from the viewpoint of the strength of the aggregate and the viewpoint of reducing production cost.

The content of carbon in the carbon source (C) is preferably 90% by mass or more, more preferably 95% by mass or more, still more preferably 99% by mass or more, and further still more preferably 100% by mass.

In the case where the carbon source (C) is present at 1.0 part by mass or more in terms of carbon, the grain growth of the primary particles is facilitated, and nitriding the boron compound progresses to improve the crystallinity of the aggregate, and therefore the disintegration strength of the aggregate is improved. In the case where the carbon source (C) is present at 20 parts by mass or less in terms of carbon, an unreacted carbon component is prevented from being left as a foreign body, namely a black foreign body, to improve the degree of whiteness and the electric insulation. From these viewpoints, the amount of the carbon source (C) to be blended based on 100 parts by mass of the mixed powder is preferably 1.5 parts by mass or more and 15 parts by mass or less, more preferably 2.0 parts by mass or more and 10 parts by mass or less, still more preferably 2.5 parts by mass or more and 7.0 parts by mass or less, and further still more preferably 3.0 parts by mass or more and 5.0 parts by mass or less in terms of carbon.

It is to be noted that in the case where the carbon-containing calcium compound such as calcium carbonate is used as the calcium compound (D) described later, the amount of the carbon-containing calcium compound to be blended is not included in the amount of the carbon source (C) to be blended and is included in the amount of the calcium compound (D) to be blended.

In the production method according to the present invention, the carbon source (C) is preferably boron carbide (hereinafter, also simply referred to as "$B_4C$") from the viewpoint of improvements in the thermal conductive properties and the electric insulation.

Thereby, the production of hBN progresses from carbon in the boron carbide crystal as a starting point to produce 4 mol of hBN from 1 mol of $B_4C$, facilitating the grain growth of the hBN primary particles in the thickness direction and also contributing to the production of the dense and strong aggregate, and therefore boron carbide is advantageous for the improvements in the thermal conductivity and the electric insulation. Moreover, the granular shape can be maintained in the process of forming a composite with a resin and the disintegration of the aggregate can be prevented or suppressed.

In addition, in the case where graphite and boron carbide are used together as the carbon source (C), the firing time becomes short, and therefore the production cost can be reduced more, and the number of black foreign bodies due to boron carbide can be reduced more than in the case where boron carbide is used singly. Furthermore, the hBN powder comprising the denser and stronger aggregate in which the form of the boron carbide particles is maintained can be produced more than the hBN powder which is grown through dissolution and deposition from crystal cores produced at the surface of graphite when graphite is used singly as the carbon source (C).

The purity of the boron carbide in the boron carbide is preferably 90% by mass or more, preferably 95% by mass or more, still more preferably 99% by mass or more, and further still more preferably 100% by mass.

The 50% volume cumulative particle size $D_{50}$ of boron carbide is preferably 1.0 µm or more and 200 µm or less. When the $D_{50}$ of boron carbide powder is 1.0 µm or more, the boron carbide powder is advantageous for producing the dense and strong aggregate while increasing the particle sizes of the primary particles of hBN and the thermal conductive properties can be improved. In addition, when the $D_{50}$ is 200 µm or less, the firing time becomes short, and therefore the production cost can be reduced, the number of black foreign bodies due to boron carbide can be reduced, and the aggregate that is suitable for achieving both the excellent thermal conductive properties and the excellent electric insulation can be obtained.

From these viewpoints, the 50% volume cumulative particle size $D_{50}$ of the boron carbide powder is preferably 5.0 µm or more, more preferably 10 µm or more, still more preferably 30 µm or more, and further still more preferably 50 µm or more and is preferably 150 µm or less, more preferably 100 µm or less, still more preferably 80 µm or less, and further still more preferably 70 µm or less.

It is to be noted that the $D_{50}$ of the boron carbide powder is measured by the method described in Examples.

<Calcium Compound (D)>

In the production method according to the present invention, 0.01 parts by mass or more and 5.0 parts by mass or less of the calcium compound (D) (hereinafter, also simply referred to as "Ca compound") is mixed based on 100 parts by mass of the mixed powder. Thereby, the tap density can be increased and the BET specific surface area can be reduced, making it possible to contribute to the production of the dense and strong aggregate.

Examples of the Ca compound include calcium carbonate, calcium oxide, calcium fluoride, and calcium chloride. Among these, calcium carbonate is preferable.

The content of calcium carbonate in the Ca compound is preferably 90% by mass or more, more preferably 95% by mass or more, still more preferably 99% by mass or more, and further still more preferably 100% by mass.

The amount of the Ca compound to be blended is preferably 0.05 parts by mass or more and 3.0 parts by mass or less, more preferably 0.10 parts by mass or more and 2.0 parts by mass or less, still more preferably 0.20 parts by mass or more and 1.0 part by mass or less, further still more preferably 0.30 parts by mass or more and 0.80 parts by mass or less, and further still more preferably 0.30 parts by mass or more and 0.50 parts by mass or less based on 100 parts by mass of the mixed powder from the viewpoint of improvements in the thermal conductive properties and the electric insulation.

(Mixing)

The production method according to the present invention comprises a mixing step of mixing the BN fine powder (A) and the boron compound (B) to obtain a mixed powder firstly, and then mixing the mixed powder, the carbon source (C), and the calcium compound (D) to obtain a mixture. The method of mixing these is not particularly limited, and any of wet mixing and dry mixing may be used, but the wet mixing is preferable. The wet mixing can be performed using a general mixer such as a Henschel mixer, a ball mill, or a ribbon blender.

In addition, a binder may be added and mixed in the mixing. The binder is not particularly limited, examples thereof include resins such as polyvinyl alcohol (PVA), cellulose, and polyvinylidene fluoride (PVDF), and polyvinyl alcohol is preferably used.

The binder is preferably used as an aqueous binder solution obtained by dissolving these resins in water. The resin content in the aqueous binder solution is preferably 1% by mass or more and 15% by mass or less, more preferably 1% by mass or more and 10% by mass or less, and still more preferably 1% by mass or more and 5% by mass or less. The amount of the aqueous binder solution to be mixed, namely to be blended, based on 100 parts by mass of the mixed powder is preferably 1 part by mass or more and 20 parts by mass or less, more preferably 5 parts by mass or more and 15 parts by mass or less, and still more preferably 8 parts by mass or more and 12 parts by mass or less.

(Molding)

The production method according to the present invention comprises a step of subsequently molding the mixture obtained through the mixing into an appropriate shape to obtain a molded body. The shape is not particularly limited; however, a columnar shape such as a tablet is preferable from the viewpoint of ease of handling.

The molding is performed so that the density of the molded body immediately after the molding can be preferably 0.50 g/cm³ or more, more preferably 0.80 g/cm³ or more, still more preferably 1.0 g/cm³ or more and can be preferably 2.0 g/cm³ or less, more preferably 1.8 g/cm³ or less, and still more preferably 1.5 g/cm³ or less from the viewpoint of improvements in the strength of the aggregate in which the primary particles of hBN aggregate, and of productivity, good handling, and reactivity.

It is to be noted that "the density of the molded body immediately after the molding" means the density of the molded body before drying in the case where the mixing is the wet mixing, and in the case where a binder and water are used in the mixing, "the density of the molded body immediately after the molding" means the density of the molded body including the binder and water.

(Firing)

The production method according to the present invention comprises a step of firing the molded body obtained through the molding. By subjecting the mixture to press molding to make the molded body and then firing the molded body, the boron compound (B) contained in the molded body reacts with the carbon source (C) and, in the case where calcium carbonate or the like is used as the Ca compound (D), carbon contained in calcium carbonate to produce the hBN aggregate having a high disintegration strength. Moreover, when boron in the boron compound (B) and calcium in the Ca compound (D) forms a flux and the crystal growth is facilitated, the hBN powder according to the present invention is obtained. It is to be noted that in the case where the firing is performed without performing the molding, it is difficult to produce the hBN aggregate having a high disintegration strength sufficiently.

The atmosphere during the firing is an atmosphere comprising a nitrogen gas. The nitrogen gas concentration in the atmosphere comprising the nitrogen gas is preferably 60% by volume or more, more preferably 80% by volume or more, still more preferably 90% by volume or more, and further still more preferably 99% by volume or more. With respect to an oxygen gas, the less, the better.

The firing temperature is preferably 1000° C. or more and 2200° C. or less. When the firing temperature is 1000° C. or more, a sufficient reductive nitriding reaction progresses. In addition, when the firing temperature is 2200° C. or less, the occurrence of the decomposition of hBN is prevented. From these viewpoints, the firing temperature is more preferably 1500° C. or more and 2200° C. or less, still more preferably 1600° C. or more and 2200° C. or less, and further still more preferably 1700° C. or more and 2200° C. or less.

The firing time is preferably 1 hour or more and 20 hours or less. When the firing time is 1 hour or more, the reductive nitriding reaction progresses sufficiently, and an unreacted carbon component is prevented from being left as a black substance. In addition, when the firing time is 20 hours or less, firing cost is reduced. From this viewpoint, the firing time is more preferably 1 hour or more and 19 hours or less, still more preferably 3 hours or more and 18 hours or less, further still more preferably 5 hours or more and 17 hours or less, and further still more preferably 10 hours or more and 16 hours or less.

It is to be noted that drying may be performed before the firing. The drying temperature is preferably 150° C. or more and 400° C. or less, more preferably 200° C. or more and 400° C. or less, and the drying time is preferably 20 hours or less and 8 hours or more.

(Pulverization)

Subsequently, the fired product obtained through the firing is preferably pulverized.

The pulverization method is not particularly limited, and pulverization with a jaw crusher and coarse roll pulverization can be adopted.

(Classification)

Subsequently, the pulverized product obtained through the pulverization is preferably classified after the firing step.

The classification method is not particularly limited, and classification can be performed with a vibrating sieve apparatus or by air flow classification, water sieving, centrifugal separation, or the like. Among others, the classification is preferably performed with the vibrating sieve apparatus. Examples of the vibrating sieve apparatus include a dry type vibrating sieve apparatus [manufactured by KOEISANGYO Co., Ltd., trade name "SATO'S SYSTEM VIBRO SEPARATOR"].

The opening of the sieve for use in the classification can be selected appropriately according to the application of a thermally conductive member in which a resin composition comprising the hBN powder to be obtained is used.

In the case where the hBN powder according to the present invention is used in a resin sheet, the opening of the sieve can be selected appropriately according to the film thickness of the resin sheet and is preferably 20 μm or more and 500 μm or less, more preferably 25 μm or more and 400 μm or less, still more preferably 30 μm or more and 300 μm or less, further still more preferably 35 μm or more and 200 μm or less, and further still more preferably 40 μm or more and 150 μm or less. In addition, the sieving time can be selected appropriately according to the opening of the sieve to be used and the amount to be charged in the apparatus, and in the case where a sieve having an opening of, for example, 95 μm is used, a powder is preferably made to pass through the sieve having an opening of 95 μm, the powder obtained through classification under a condition of a sieving time of 60 minutes.

{Classified Hexagonal Boron Nitride Powder}

The hexagonal boron nitride powder (hBN powder) according to the present invention may be further classified to make a classified hexagonal boron nitride powder (hereinafter, also simply referred to as "classified hBN powder") so that a particle size distribution curve showing a frequency distribution based on volume of the classified hBN powder can be a monomodal distribution curve. The classification method for obtaining the classified hBN powder is not particularly limited, and the classification can be performed with the vibrating sieve apparatus or by the air flow classification, the water sieving, the centrifugal separation, or the like in the same manner as in the classification in the method for producing the hBN powder. Among others, the classification is preferably performed with the vibrating sieve apparatus. Examples of the vibrating sieve apparatus include the dry type vibrating sieve apparatus [manufactured by KOEISANGYO Co., Ltd., trade name "SATO'S SYSTEM VIBRO SEPARATOR"]. In the case where the classification is performed with the vibrating sieve apparatus, the opening of the sieve for use in the classification can be selected appropriately according to the film thickness of a resin sheet obtained by molding a resin composition comprising the hBN powder to be obtained and is preferably 20 μm or more and 500 μm or less, more preferably 30 μm or more and less than 400 μm, still more preferably 45 μm or more and 300 μm or less, further still more preferably 60 μm or more and 200 μm or less, and further still more preferably 75 μm or more and 150 μm or less. The classified hBN powder is obtained as a fraction passing through the sieve having the opening.

The particle size distribution curve showing a frequency distribution based on volume of the classified hBN powder has a monomodal particle size distribution curve having a maximum peak in a range of a particle size of 500 μm or less from the viewpoint of improvements in the thermal conductive properties and the electric insulation. The particle size at the maximum peak is preferably 5 μm or more and 50 μm or less, more preferably 7 μm or more and 40 μm or less, still more preferably 10 μm or more and 30 μm or less, and further still more preferably 10 μm or more and 20 μm or less. Thereby, the frequency on the larger particle size side becomes high and the content of the hBN powder having a large particle size becomes large, and therefore the classified hBN powder comprising a dense and strong aggregate can be obtained, so that the excellent thermal conductive properties and electric insulation can be exhibited in the same manner as in the hBN powder.

It is to be noted that in the case where the classification step is performed after the firing step, the powder the particle size distribution curve of which shows the bimodal distribution curve is determined to be the hBN powder, and the powder the particle size distribution curve of which shows the monomodal distribution curve is determined to be the classified hBN powder.

{Resin Composition}

The resin composition according to the present invention comprises 10% by volume or more and 90% by volume or less of the hexagonal boron nitride powder (hBN powder) as a filler. The content of the hBN powder in the resin composition according to the present invention is 10% by volume or more and 90% by volume or less, preferably 20% by volume or more and 80% by volume or less, more preferably 30% by volume or more and 70% by volume or less, still more preferably 35% by volume or more and 65% by volume or less, and further still more preferably 40% by volume or more and 60% by volume or less from the viewpoint of ease of production in the process of forming a composite with a resin and improvements in the thermal conductive properties and the electric insulation.

By using the hBN powder, the aggregate can maintain the granular shape without disintegrating in the process of forming a composite with a resin in producing the resin composition, and therefore the filling rate in the resin composition can be improved, and as a result, the excellent thermal conductive properties and electric insulation can be exhibited.

It is to be noted that the content of the hBN powder (% by volume) in the resin composition according to the present invention can be calculated by measuring the content of the hBN powder (% by mass) in the resin composition by the combustion method described in "Testing methods for carbon fiber content and void content of carbon fiber reinforced plastics (JIS K 7075:1990" after measuring the density of the resin composition. Specifically, the content of the hBN powder (% by volume) in the resin composition according to the present invention is calculated by multiplying the measured content of the hBN powder (% by mass) by a ratio of the density of the resin composition based on the density of boron nitride, [content of hBN powder (% by mass) in resin composition×(density of resin composition/density of boron nitride)].

Moreover, in the present invention, the content based on volume (% by volume) of the hBN powder at the time of blending can be determined from the specific gravity of the hBN powder, the specific gravities of various resins for use as an organic matrix, and the proportion (parts by mass) of each component blended. In addition, in the case where the resin sheet is a thin-film resin sheet having a film thickness of 110 μm or less as described below, the classified hBN powder obtained by further classifying the hBN powder with the vibrating sieve apparatus or the like is preferably used in the resin composition according to the present invention. The content of the classified hBN powder (% by volume) in the resin composition according to the present invention is the same as the content of the hBN powder.

<Organic Matrix>

The resin composition according to the present invention comprises a resin as an organic matrix.

The resin for use in the present invention preferably comprises at least one resin selected from the group consisting of thermosetting resins, thermoplastic resins, various kinds of rubber, thermoplastic elastomers, oil, and the like.

Examples of the thermosetting resins include epoxy resins, silicone resins, phenol resins, urea resins, unsaturated polyester resins, melamine resins, polyimide resins, polybenzoxazole resins, and urethane resins.

Examples of the thermoplastic resins include: polyolefin resins such as polyethylene, polypropylene, and ethylene-vinyl acetate copolymers; polyester resins such as polyethylene terephthalate, polybutylene terephthalate, and liquid crystal polyesters; and polyvinyl chloride resins, acrylic resins, polyphenylene sulfide resins, polyphenylene ether resins, polyamide resins, polyamideimide resins, and polycarbonate resins.

Examples of the various kinds of rubber include natural rubber, polyisoprene rubber, styrene-butadiene copolymer rubber, polybutadiene rubber, ethylene-propylene copolymers, ethylene-propylene-diene copolymers, butadiene-acrylonitrile copolymers, isobutylene-isoprene copolymers, chloroprene rubber, silicone rubber, fluororubber, chlorosulfonated polyethylenes, and polyurethane rubber. These kinds of rubber are preferably crosslinked and used.

Examples of the thermoplastic elastomers include olefin-based thermoplastic elastomers, styrene-based thermoplastic elastomers, vinyl chloride-based thermoplastic elastomers, urethane-based thermoplastic elastomers, and ester-based thermoplastic elastomers.

Examples of the oil component include grease such as silicone oil.

The organic matrices may be used singly or in a combination or two or more.

The resin for use as the organic matrix can be selected appropriately according to the application of a thermally conductive member obtained using the resin composition according to the present invention and demand characteristics such as the mechanical strength, heat resistance, durability, softness, and flexibility of the thermally conductive member.

Among these, at least one resin selected from the group consisting of various thermosetting resins, thermoplastic resins, rubber, and thermoplastic elastomers, and the like which are used as the organic matrix of the conventional resin sheets, more preferably thermosetting resins, still more preferably curable epoxy resins and curable silicone resins, and further still more preferably curable epoxy resins from the viewpoint of suppressing the anisotropy and the viewpoint of improvements in the thermal conductive properties.

The content of the organic matrix in the resin composition is preferably 10% by volume or more and 90% by volume or less, more preferably 20% by volume or more and 80% by volume or less, still more preferably 30% by volume or more and 70% by volume or less, further still more preferably 35% by volume or more and 65% by volume or less, and further still more preferably 40% by volume or more and 60% by volume or less from the viewpoint of the ease of production in the process of forming a composite with a resin and the thermal conductive properties.

In the present invention, the content based on volume (% by volume) of the organic matrix can be determined from the specific gravity of the hBN powder and specific gravities of various resins for use as the organic matrix.

{Curable Epoxy Resin}

In the resin composition according to the present invention, as the curable epoxy resin for use as the organic matrix, epoxy resins which are in a liquid form at normal temperature (namely, 25° C.) and low softening point epoxy resins which are in a solid form at normal temperature (namely, 25° C.) are preferable from the viewpoint of dispersibility of the hBN powder to the organic matrix.

The curable epoxy resin is not particularly limited as long as the curable epoxy resin is a compound having two or more epoxy groups in one molecule, and any of the publicly known compounds which have been used conventionally as the epoxy resin can be selected and used appropriately. Examples of such an epoxy resin include bisphenol A type epoxy resins, bisphenol F type epoxy resins, glycidyl ethers of a polycarboxylic acid, and epoxy resins obtained through epoxidation of a cyclohexane derivative. These may be used singly or in a combination of two or more. Among the epoxy resins, bisphenol A type epoxy resins, bisphenol F type epoxy resins, and epoxy resins obtained through epoxidation of a cyclohexane derivative are suitable from the viewpoint of the heat resistance, workability, and the like.

In addition, the curable epoxy resin preferably further comprises a thermoplastic resin blended therein, the thermoplastic resin being soluble in the epoxy resin. Particularly, by adding a thermoplastic resin that maintains a relatively high viscosity even at high temperatures during curing, segregation or the like of the hBN powder can be prevented and mechanical properties, such as toughness, of the resin sheet can be improved.

As the thermoplastic resin, thermoplastic resins comprising a hydrogen-bonding functional group are preferable, and examples of the hydrogen-bonding functional group include an alcoholic hydroxy group, an amide bond, a sulfonyl group, and a carboxyl group.

Specific examples of the thermoplastic resin include: thermoplastic resins comprising an alcoholic hydroxy group, such as polyvinyl acetal resins including polyvinyl formal and polyvinyl butyral, polyvinyl alcohol, and phenoxy resins; thermoplastic resins comprising an amide bond, such as polyamide, polyimide, polyamideimide, and polyvinylpyrrolidone; thermoplastic resins comprising a sulfonyl group, such as polysulfone; and thermoplastic resins comprising a carboxyl group, such as polyester, polyamide, polyamideimide. Among these, thermoplastic resins comprising an alcoholic hydroxy group are preferable, more preferably phenoxy resins from the viewpoint of the prevention of the segregation or the like of the hBN powder and of improving the mechanical properties, such as toughness, of the resin sheet.

The amount of the thermoplastic resin comprising a hydrogen-bonding functional group to be blended is preferably 0.05 parts by mass or more and 50 parts by mass or less, more preferably 1.0 part by mass or more and 30 parts by mass or less, and still more preferably 5 parts by mass or more and 25 parts by mass or less based on 100 parts by mass of the total of the curable epoxy resin, and a curing agent and a curing accelerator which are used as necessary.

(Curing Agent for Epoxy Resin)

A curing agent for epoxy resins may be used for curing the curable epoxy resin. The curing agent for epoxy resins is not particularly limited, any of the curing agents which have been used conventionally as the curing agent for epoxy resins can be selected and used appropriately, and examples thereof include amine-based, phenol-based, acid anhydride-based and imidazole-based curing agents. Examples of the amine-based curing agents preferably include dicyandiamide and aromatic diamines such as m-phenylenediamine, 4,4'-diaminodiphenylmethane, 4,4'-diaminodiphenylsulfone, and m-xylylenediamine. Examples of the phenol-based curing agents preferably include phenol novolac resins, cresol novolac resins, bisphenol A type novolac resins, and triazine-modified phenol novolac resins. In addition, examples of the acid anhydride-based curing agents include alicyclic acid anhydrides such as methylhexahydrophthalic anhydride, aromatic acid anhydrides such as phthalic anhydride, aliphatic acid anhydrides such as aliphatic dibasic acid anhydrides, and halogen-based acid anhydrides such as chlorendic anhydride. Examples of the imidazole-based curing agents include 2-methylimidazole, 2-undecylimidazole, 2-heptadecylimidazole, 2-ethyl-4-methylimidazole, 2-phenylimidazole, 2-phenyl-4-methylimidazole, and 1-cyanoethyl-2-ethyl-4-methylimidazole.

These curing agents may be used singly or in a combination of two or more. The amount of the curing agent for epoxy resins to be used is usually selected in a range of an equivalent ratio of about 0.5 to about 1.5, preferably in a range of an equivalent ratio of 0.7 to 1.3 in terms of the equivalent ratio of the curing agent to the curable epoxy resin from the viewpoint of curability, a balance among physical properties of a cured resin, and the like.

(Curing Accelerator for Epoxy Resins)

In the resin composition according to the present invention, a curing accelerator for epoxy resins can be used as necessary together with the curing agent for epoxy resins.

The curing accelerator for epoxy resins is not particularly limited, any of the curing accelerators which have been used conventionally as the curing accelerator for epoxy resins can be selected and used appropriately.

Examples include imidazole compounds such as 2-ethyl-4-methylimidazole, 1-benzyl-2-methylimidazole, 2-methylimidazole, 2-ethylimidazole, 2-isopropylimidazole, 2-phenylimidazole, and 2-phenyl-4-methylimidazole, 2,4,6-tris (dimethylaminomethyl)phenol, boron trifluoride-amine complexes, and triphenylphosphine. These curing accelerators may be used singly or in a combination of two or more. The amount of the curing accelerator for epoxy resins to be used is usually selected in a range of about 0.1 to about 10 parts by mass, preferably in a range of 0.4 to 5 parts by mass based on 100 parts by mass of the curable epoxy resin from the viewpoint of curing acceleration properties, the balance among physical properties of the cured resin, and the like.

{Curable Silicone Resin}

As the curable silicone resin, a mixture of an addition reaction type silicone resin and a silicone-based crosslinking agent can be used. Examples of the addition reaction type silicone resin include at least one selected from the group consisting of polyorganosiloxanes comprising an alkenyl group as a functional group in the molecule. Preferred examples of the polyorganosiloxanes comprising an alkenyl group as a functional group in the molecule include a polydimethylsiloxane comprising a vinyl group as a functional group, a polydimethylsiloxane comprising a hexenyl group as a functional group, and a mixture thereof.

Examples of the silicone-based crosslinking agent include polyorganosiloxanes comprising at least 2 silicon atom-bonded hydrogen atoms in one molecule, specifically, dimethylsiloxane-methylhydrogensiloxane copolymers end-capped with a dimethylhydrogensiloxy group, dimethylsiloxane-methylhydrogensiloxane copolymers end-capped with a trimethylsiloxy group, poly(methylhydrogensiloxane) end-capped with a trimethylsiloxane group, and poly(hydrogen silsesquioxane).

In addition, as a curing catalyst, a platinum-based compound is usually used. Examples of the platinum-based compound include particulate platinum, particulate platinum adsorbed on a carbon powder carrier, chloroplatinic acid, alcohol-modified chloroplatinic acid, and olefin complexes of chloroplatinic acid. Examples of other curing catalysts include palladium catalysts and rhodium catalysts.

The resin composition according to the present invention may further comprise another component in a range where the effects of the present invention are obtained. Examples of such a component include a particle of a nitride such as aluminum nitride, silicon nitride, and fibrous boron nitride, electrically insulating metal oxides such as alumina, fibrous alumina, zinc oxide, magnesium oxide, beryllium oxide, and titanium oxide, electrically insulating carbon components such as diamond and fullerene, a plasticizing agent, an adhesive, a reinforcing agent, a coloring agent, a heat resistance improver, a viscosity modifier, a dispersion stabilizer, and a solvent.

Moreover, in the resin composition according to the present invention, an inorganic filler such as aluminum hydroxide or magnesium hydroxide, a surface treating agent such as a silane coupling agent which improves the adhesion strength at an interface between the inorganic filler and the resin, a reducing agent, or the like may be added in addition to the materials each listed as an example of the nitride particle and the electrically insulating metal oxide as long as the effects of the present invention are not impaired.

The resin composition according to the present invention can be produced, for example, in the manner as described below.

The organic matrix is first prepared by mixing the resin, and the curing agent and the solvent as necessary.

Subsequently, the hBN powder is added to the organic matrix so that the hBN powder can be contained in a proportion of 10% by volume or more and 90% by volume or less in the total amount of the hBN powder and the organic matrix. The weight of the hBN powder and of the resin are each set according to the specific gravity of the hBN powder and the specific gravity of the resin to be used as the organic matrix so that a desired % by volume of the hBN powder and of the resin can be contained, and the hBN powder and the resin are weighed and then mixed to prepare the resin composition.

In the case where the curable epoxy resin is used as a main component of the organic matrix in the resin composition according to the present invention, a mixture of the curable epoxy resin, and the curing agent for epoxy resins and the curing accelerator for epoxy resins which are used as necessary forms the organic matrix. In addition, in the case where the curable silicone resin is used as a main component of the organic matrix, a mixture of the addition reaction type silicone resin, the silicone-based crosslinking agent, and the curing catalyst forms the organic matrix.

The resin composition which is obtained in this way can be used for a thermally conductive member such as a thermally conductive sheet, thermally conductive gel, thermally conductive grease, a thermally conductive adhesive, or a phase change sheet. As a result, the heat from a heat generating electronic component such as an MPU, a power transistor, or a transformer can be transferred efficiently to a heat dissipation component such as a heat dissipation fin or a heat dissipation fan.

Among the thermally conductive members, the resin composition is preferably used as a thermally conductive sheet and for a resin sheet. By using the resin composition for a resin sheet, the effects of the resin composition can be particularly exhibited from the viewpoint of suppressing the anisotropy and the viewpoint of improvements in the thermal conductive properties.

{Resin Sheet}

The resin sheet according to the present invention comprises the resin composition or a cured product thereof and is obtained by molding the resin composition into a sheet. In the case where the resin composition is curable, the resin sheet according to the present invention is obtained by molding the resin composition into a sheet and then curing the molded resin composition.

The resin sheet according to the present invention can be produced by applying the resin composition on a base material, such as a releasable film including a resin film with a release layer, or the like, with a usual coating machine or the like, and, in the case where the resin composition comprises a solvent, then drying the solvent with a far infrared ray radiation heater, or by hot air blowing or the like to form a sheet.

As the release layer, a melamine resin or the like is used. In addition, as the resin film, a polyester resin or the like such as polyethylene terephthalate is used. In the case where the organic matrix in the resin composition is not a curable organic matrix such as the curable epoxy resin or the curable silicone resin, the resin sheet per se which is formed into a sheet is the resin sheet according to the present invention.

Further, in the case where the organic matrix is a curable matrix, the resin composition layer which is obtained above and formed on the base material is pressurized as necessary through the base material from a side of a surface of the base material, the surface not coated with the resin composition, and is then further subjected to a heat treatment to be cured to obtain the resin sheet according to the present invention. The pressurization condition is preferably 15 MPa or more and 20 MPa or less, more preferably 17 MPa or more and 19 MPa or less. In addition, the heat condition is preferably 80° C. or more and 200° C. or less, more preferably 100° C. or more and 150° C. or less. It is to be noted that the base material for the releasable film and the like is usually peeled or removed finally.

The film thickness of the resin sheet according to the present invention which is obtained in this way is preferably 50 μm or more and 10 mm or less, more preferably 50 μm or more and 1.0 mm or less, still more preferably 50 μm or more and 500 μm or less, further still more preferably 60 μm or more and 400 μm or less, and further still more preferably 70 μm or more and 300 μm or less from the viewpoint of moldability. Moreover, the film thickness of the resin sheet according to the present invention is preferably in a range of 50 μm or more and 150 μm or less, more preferably 60 μm or more and 130 μm or less, and still more preferably 70 μm or more and 110 μm or less from the viewpoint of reducing the weight and thickness of electronic components and the like for which the resin sheet is used.

In the case where the resin sheet is a thin-film resin sheet having a film thickness of 110 μm or less, the resin composition comprising the classified hBN powder obtained by further classifying the hBN powder with the vibrating sieve apparatus or the like is preferably molded.

The resin sheet according to the present invention has a thermal conductivity in the thickness direction of preferably 12 W/m·K or more, more preferably 13 W/m·K or more, still more preferably 14 W/m·K or more, and further still more preferably 15 W/m·K or more.

The resin sheet according to the present invention has a specific gravity rate of preferably 90% or more and 100% or less, more preferably 95% or more and 100% or less, and still more preferably 97% or more and 100% or less from the viewpoint of the electric insulation.

It is to be noted that the thermal conductivity and the specific gravity rate can be each measured by the method described in Examples.

The resin sheet according to the present invention may be used by laminating or embedding a member in a sheet form, a fiber form, or a net-like appearance on one surface or both surfaces thereof, or in the sheet, for improving workability or reinforcement.

The resin sheet thus obtained can be made to be a product form for use as a resin sheet in a state where the obtained resin sheet is peeled from the releasable film or in a state where the releasable film is used as a protective film.

Moreover, the resin sheet according to the present invention may have a configuration in which an adhesive layer is further provided on the upper surface or the lower surface of the resin sheet, thereby enhancing convenience during the use of a product.

The resin sheet according to the present invention is used, for example, as a thermally conductive sheet with which the heat from a heat generating electronic component such as an MPU, a power transistor, or a transformer is transferred to a heat dissipation component such as a heat dissipation fin or a heat dissipation fan, and is used by being interposed between the heat generating electronic component and the heat dissipation component. Thereby, the heat transfer between the heat generating electronic component and the heat dissipation component becomes good and malfunction of the heat generating electronic component can be reduced remarkably.

EXAMPLES

Hereinafter, the present invention will be described further specifically giving Examples and Comparative Examples, but the present invention is not limited by these examples.

Example 1

(1) Preparation of Mixed Powder

As the BN fine powder (A), 67.5 parts by mass of a BN fine powder (A-1) having the following properties and 32.5 parts of boron oxide ($B_2O_3$, boric anhydride) manufactured by KANTO CHEMICAL CO., INC. as the boron compound (B) were mixed using a mixer to obtain a mixed powder (X1) having a content of the BN fine powder (A) of 67.5% by mass and a content of the boron compound (B) of 32.5% by mass.

BN fine powder (A-1): ratio [$L_2/d_2$] 6.3, $D_{50}$ 0.62 μm, BET specific surface area 9.5 $m^2/g$, crystallite size 257 Å

(2) Preparation of hBN Powder

As the carbon source (C), 3.3 parts by mass of boron carbide ($B_4C$, $D_{50}$ of boron carbide: 23 μm) manufactured by RIKEN CORUNDUM CO., LTD. in terms of carbon, 0.4 parts by mass of calcium carbonate ($CaCO_3$) manufactured by Wako Pure Chemical Industries, Ltd. as the Ca compound (D), and 10 parts by mass of an aqueous PVA solution (concentration of 2.5% by mass) were added based on 100 parts by mass of the mixed power (X1) to obtain a mixture having a content of the carbon source (C) in terms of carbon of 3.3 parts by mass and a content of the Ca compound (D) of 0.4 parts by mass each based on 100 parts by mass of the mixed powder. The mixture was stirred and mixed with a mixer, thereafter put into a metal mold, and then pressurized to obtain a tablet-like molded body before firing having a density of 1.4 $g/cm^3$. The molded body before firing was dried in a dryer at 300° C. for 6 hours to obtain a dried product. The dried product was fired in a high-frequency furnace at 1600° C. to 2200° C. under a nitrogen gas atmosphere for 16 hours in total to obtain an hBN fired product.

The obtained hBN fired product was pulverized using a jaw crusher and a pin mill and was then classified using the dry type vibrating sieve apparatus [manufactured by KOEI-SANGYO Co., Ltd., trade name "SATO'S SYSTEM VIBRO SEPARATOR"] with a sieve having an opening of 95 μm under a condition of a sieving time of 60 minutes to obtain a fraction passing through the sieve as the hBN powder according to the present invention.

When the obtained hBN powder was observed with an SEM, it was ascertained that the hBN powder comprises an hBN aggregate in which each primary particle faces in a random direction as shown in FIG. 2 and FIG. 3. It is to be noted that FIG. 1 is a schematic diagram of the hBN aggregate existing in FIG. 2 and in FIG. 3.

(3) Preparation of Resin Composition

As the organic matrix, 100 parts by mass of a curable liquid epoxy resin [resin mixture obtained by blending a phenoxy resin (trade name "YP-50S", manufactured by NIPPON STEEL & SUMIKIN CHEMICAL CO., LTD., purity: 99.0% by mass or more) with a bisphenol A type epoxy resin (trade name "YD-128", manufactured by NIPPON STEEL & SUMIKIN CHEMICAL CO., LTD., epoxy equivalence: 184 to 194 g/eq) so that the mass ratio of the bisphenol A type epoxy resin and the phenoxy resin was 90:10] was used, the hBN powder obtained above was then added thereto so that the hBN powder content in the total amount of the hBN powder and the organic matrix was 60% by volume, 170 parts by mass of methoxy propanol (trade name "Hisolve MP", manufactured by TOHO CHEMICAL INDUSTRY CO., LTD.) was then added thereto based on 100 parts by mass of the curable liquid epoxy resin to modify the viscosity, and the resultant mixture was stirred and mixed using MAZERUSTAR® manufactured by KURABO INDUSTRIES LTD. to prepare a resin composition.

It is to be noted that the content based on volume (% by volume) of the hBN powder was determined from the specific gravity of the hBN powder (2.27) and the specific gravity of the curable liquid epoxy resin (1.17) used as the organic matrix.

(4) Preparation of Resin Sheet

A releasable film was coated using a coater with the resin composition obtained above so that the film thickness was 350 μm to form a resin composition layer, and the resin composition layer was dried at 50° C. for 10 minutes and then at 50° C. in a vacuum for 10 minutes. Two sheets of the releasable films were piled up so that the resin composition layers were brought into contact with each other, the piled-up sheets were then passed through a roll, and the sheet pressure was adjusted so that the film thickness of the resin sheet was 200 μm. Thereafter, hot-pressing was performed at 120° C. for 30 minutes to cure the resin composition layer, thereby preparing a resin sheet.

Examples 2 to 6 and Comparative Examples 1 to 3 hBN powders, resin compositions, and resin sheets were each prepared in the same manner as in Example 1 except that at least one of the amount of each component blended and the $D_{50}$ of boron carbide ($B_4C$) in Example 1 was changed as shown in Table 1.

{Evaluation}

The following evaluations were conducted for the BN fine powders, the hBN powders, the resin compositions, and the resin sheets. The evaluation results are shown in Tables 2 and 3.

($D_{50}$ of Boron Carbide)

Dispersion liquids each comprising 0.1 g of boron carbide used in each of Examples and Comparative Examples, 50 g of water, and as a dispersant, 0.005 g of a detergent sold on the market (trade name "Mama Lemon" manufactured by Lion Corporation) were prepared. Subsequently, the 50% volume cumulative particle size $D_{50}$ of each boron carbide powder was measured from a particle size distribution obtained using the particle size distribution analyzer (manufactured by NIKKISO CO., LTD., model name "Microtrac MT3300EX II") while each dispersion liquid was stirred using a magnetic stirrer under a condition of a number of revolutions of 400 rpm.

(Average Longer Diameter ($L_1$) of Primary Particles of hBN Powder)

An SEM photograph was taken for the hBN powder obtained in each of Examples and Comparative Examples, and the longer diameters were measured for 100 hBN primary particles arbitrarily selected from the primary particles in the SEM photograph, and the number average value of the longer diameters was determined as the average longer diameter ($L_1$) of the primary particles of the hBN powder.

(Ratio [$L_2/d_2$] of BN Fine Powder and Ratio [$L_1/d_1$] of hBN Powder)

Firstly, an SEM photograph was taken for the BN fine powder used in each of Examples and Comparative Examples, and the longer diameters and the shorter diameters were measured for 100 primary particles arbitrarily selected from the primary particles in the SEM photograph. The number average value of the longer diameters was determined as the average longer diameter ($L_2$) of the primary particles, and the number average value of the thicknesses was determined as the average thickness ($d_2$) of the primary particles to calculate the ratio of the average longer diameter to the average thickness of the primary particles, [$L_2/d_2$].

Next, an SEM photograph was taken for the hBN powder obtained in each of Examples and Comparative Examples, and the longer diameters and the shorter diameters were measured for 100 primary particles arbitrarily selected from the primary particles in the SEM photograph. The number average value of the longer diameters was determined as the average longer diameter ($L_1$) of the primary particles, and the number average value of the thicknesses was determined as the average thickness ($d_1$) of the primary particles to calculate the ratio of the average longer diameter to the average thickness of the primary particles, [$L_1/d_1$].

(Tap Density of hBN Powder)

Firstly, 100 g of the hBN powder obtained in each of Examples and Comparative Examples was put into a 300-ml measuring flask. Next, the cylinder was tapped 50 times in a row from a height of 1 cm, and the volume value of the hBN powder after the tapping was checked. This operation was counted as 1 set, and the set was repeated to read a volume value when the value did not vary for 3 sets in a row. The tap density was calculated from the volume value.

(BET Specific Surface Area of BN Fine Powder and of hBN Powder)

The BET specific surface area was measured for the BN fine powders used in Examples and Comparative Examples and the hBN powders obtained in Examples and Comparative Examples by the BET one-point method utilizing the fluid process using a full-automatic BET specific surface area measuring apparatus [manufactured by Yuasa Ionics Inc., model name "Multisorb 16"].

(Peak Heights ($H_A$) and ($H_B$), Particle sizes at Peak Tops ($T_A$) and ($T_B$), and Particle Size at Valley Between Peaks)

The particle size distribution curve was obtained for hBN powders obtained in Examples and Comparative Examples using the particle size distribution analyzer [manufactured by NIKKISO CO., LTD., model name "Microtrac MT3300EX II"] of the laser diffraction scattering method. Specifically, dispersion liquids each obtained by dispersing 0.06 g of the hBN powder of each of Examples and Comparative Examples in 50 g of water were prepared. The particle size distribution was measured for the dispersion liquids with the particle size distribution analyzer while the dispersion liquids were stirred using a magnetic stirrer under a condition of a number of revolutions of 400 rpm.

In the particle size distribution curve, the maximum peak existing on the larger particle size side was defined as the first peak and a peak existing on the smaller particle size side of the first peak was defined as the second peak to derive the first peak height ($H_A$) and the second peak height ($H_B$) from the maximum heights (frequency (%)) of respective peaks. Furthermore, the ratio [($H_B$)/($H_A$)] was calculated from the obtained heights of the first peak and the second peak. Moreover, the particle size at the maximum height of the first peak and of the second peak in the particle size distribution curve were defined as the particle size at the first peak top ($T_A$) and the particle size at the second peak top ($T_B$) respectively to calculate the difference [($T_A$)–($T_B$)].

Furthermore, the particle size at the minimum point between the first peak and the second peak in the particle size distribution curve was defined as the particle size at the valley between the peaks.

FIG. 5 is a particle size distribution curve used for calculating the various numerical values in Example 1.

(Peak Decrease Rate)

The measurement of the peak decrease rate was conducted using a particle size distribution analyzer [manufactured by NIKKISO CO., LTD., model name "Microtrac MT3300EX II"] of the laser diffraction scattering method. Firstly, the hBN powder of each of Examples and Comparative Examples was classified with the dry type vibrating sieve apparatus (sieving time of 60 minutes) using a sieve having an opening of 95 μm and a sieve having an opening of 45 μm with the two sieves piled up. Next, 0.06 g of the hBN powder obtained as a fraction between the sieves of 45 μm or more and 95 μm or less was dispersed in 50 g of water to prepare a dispersion liquid. The measurement of the particle size distribution was conducted for the dispersion liquid with the particle size distribution analyzer while the dispersion liquid was stirred using a magnetic stirrer under a condition of a number of revolutions of 400 rpm. Subsequently, the dispersion liquid was placed in a 50-ml container and was then subjected to an ultrasonic treatment for 1 minute under conditions of an output of 150 W and an oscillating frequency of 19.5 kHz, and thereafter the measurement of the particle size distribution was conducted under the same conditions as for the dispersion liquid before the ultrasonic treatment.

In the respective particle size distribution curves obtained before and after the ultrasonic treatment, the maximum peaks existing between a particle size of 45 μm or more and a particle size of 150 μm or less were compared.

FIG. 6 is a reference graph of a graph showing the particle size distribution curves. In this figure, the peak decrease rate [=[(maximum peak height before treatment (a))−(maximum peak height after treatment (b))]×100/(maximum peak height before treatment (a))] was calculated. The broken line in the figure shows a graph showing the particle size distribution curve of the hBN powder before the ultrasonic treatment, and the solid line shows a graph showing the particle size distribution curve of the hBN powder after the ultrasonic treatment. It can be said that the lower the peak decrease rate is, the higher the disintegration strength is. It is to be noted that the ultrasonic treatment in the present invention was performed using an ultrasonic treatment apparatus [manufactured by NIHONSEIKI KAISHA LTD., model name "Ultrasonic Homogenizer US-150V"].

It is to be noted that the reference graph is a figure which is shown to describe the method of calculating the peak decrease rate.

(Crystallite Size of BN Fine Powder and of hBN Powder)

The crystallite size of the BN fine powder used in each of Examples and Comparative Examples and of the hBN powder obtained in each of Examples and Comparative Examples were calculated through X-ray diffraction measurement. As an X-ray diffraction measuring apparatus, a model name "X'Pert PRO" manufactured by PANalytical B.V. was used, and Cu-Kα-1 line was used by use of a Cu target.

(50% Volume Cumulative Particle Size ($D_{50}$) of BN Fine Powder)

The 50% volume cumulative particle size ($D_{50}$) was measured using the particle size distribution analyzer [manufactured by NIKKISO CO., LTD., model name "Microtrac MT3300EX II"].

The measurement of the particle size distribution was conducted using a dispersion liquid prepared by subjecting 0.06 g of the BN fine powder used in each of Examples and Comparative Examples to an ultrasonic treatment in 50 g of water for 3 minutes. The 50% volume cumulative particle size $D_{50}$ of the BN fine powder was determined by the particle size distribution obtained while the dispersion liquid was stirred using a magnetic stirrer under a condition of a number of revolutions of 400 rpm.

(Density of Molded Body Immediately after Molding)

The mass and the volume of each molded body immediately after molding were measured, and the density of the molded body was determined from these values.

(Boron Oxide ($B_2O_3$) Content and Calcium Oxide (CaO) Content in hBN Powder)

The hBN powder obtained in each of Examples and Comparative Examples was subjected to an acid treatment with 0.1 N a diluted sulfuric acid solution. Through this acid treatment, boron oxide (hereinafter, also simply referred to as "$B_2O_3$") and calcium oxide (hereinafter, also simply referred to as "CaO") in the hBN powder dissolve in the acid solution.

Subsequently, the amount of an B element existing in the acid solution after the acid treatment was measured with an apparatus for ICP analysis [manufactured by SII Nano Technology Inc., model name "SPS 3500"]. The content of $B_2O_3$ which had dissolved through the acid treatment was calculated from the amount of the B element existing in the acid solution after the acid treatment.

Furthermore, the amount of a Ca element existing in the acid solution after the acid treatment was measured with the apparatus for ICP analysis. The content of CaO which had dissolved through the acid treatment was calculated from the amount of the Ca element existing in the acid solution after the acid treatment.

(Carbon Content in hBN powder)

The content of carbon in the hBN powder obtained in each of Examples and Comparative Examples (carbon content) was measured using a carbon analyzer [manufactured by LECO Japan Corporation, model name "CS230"].

(Purity of hBN powder)

The total amount of the $B_2O_3$ content, the CaO content, and the carbon content in the hBN powder measured as described above were regarded as the amount of impurities to determine the purity of the hBN powder.

(Thermal Conductivity of Resin Sheet)

The thermal diffusivity was measured for the resin sheets obtained in Examples and Comparative Examples with a model name "LF A447 NanoFlash" manufactured by Erich NETZSC GmbH & Co. Holding KG. A value obtained by multiplying the thermal diffusivity value by theoretical values of the specific heat and the density of each resin sheet was determined as the thermal conductivity in the thickness direction of the resin sheet.

It is to be noted that the specific heat of the resin sheet of each of Examples or Comparative Examples was calculated assuming the theoretical specific heat of boron nitride to be 0.8 and the theoretical specific heat of the resin component to be 1.8. In addition, the theoretical value of the density of the resin sheet of each of Examples and Comparative Examples was calculated assuming the theoretical density of boron nitride to be 2.27 g/cm$^3$ and the theoretical density of the resin component to be 1.17 g/cm$^3$.

(Specific Gravity Rate of Resin Sheet)

The specific gravity rate of the resin sheet obtained in each of Examples and Comparative Examples was calculated by dividing the specific gravity of the resin sheet of each of Examples or Comparative Examples, which was measured using an electronic balance (model name "CP224S") and specific gravity/density determination kit (model name "YDK01/YDK01-OD/YDK01LP") each manufactured by Sartorius Mechatronics Japan K.K. by an Archimedes method, by the theoretical specific gravity of the resin sheet of each of Examples or Comparative Examples, and then multiplying the result by 100, [(specific gravity measured for resin sheet of each of Examples or Comparative Examples/theoretical specific gravity of resin sheet of each of Examples or Comparative Examples)×100].

It is to be noted that in the calculation of the theoretical specific gravity of the resin sheet of each of Examples or Comparative Examples, the calculation was conducted assuming the theoretical density of boron nitride to be 2.27 g/cm$^3$ and the theoretical density of the resin component to be 1.17 g/cm$^3$.

(Withstand Voltage)

The withstand voltage was measured for the resin sheets obtained in Examples and Comparative Examples using a withstanding voltage/insulation resistance measuring apparatus (model name "TOS 9201/5101") manufactured by KIKUSUI ELECTRONICS CORPORATION at a voltage elevation rate of 0.1 kV/sec and was evaluated on a four-level scale of A++, A+, A, and B in the order of excellence with the most excellent withstand voltage level being ranked as A++. When the withstand voltage is evaluated as B or above, the electric insulation with which the resin sheet can be put into practical use is obtained.

The conditions for preparing the hBN powders of Examples and Comparative Examples described above are shown in Table 1, and the evaluation results are shown in Tables 2 and 3.

TABLE 1

|  |  | Mixed powder | | | | Ca compound (D) |
|---|---|---|---|---|---|---|
|  |  | BN fine powder (A) | Boron compound (B) | Carbon source (C) B$_4$C | | CaCO$_3$ |
|  |  | | B$_2$O$_3$ | Parts by | | |
|  |  | Type | % by mass (*1) | % by mass (*1) | mass (*2) | D$_{50}$ [μm] | Parts by mass (*3) |
| Examples | 1 | A-1 | 67.5 | 32.5 | 3.3 | 23 | 0.4 |
|  | 2 | A-1 | 67.5 | 32.5 | 3.3 | 67 | 0.4 |
|  | 3 | A-1 | 67.5 | 32.5 | 2.8 | 67 | 0.4 |
|  | 4 | A-1 | 67.5 | 32.5 | 2.8 | 23 | 0.4 |
|  | 5 | A-1 | 70.0 | 30.0 | 2.8 | 67 | 0.4 |
|  | 6 | A-1 | 67.5 | 32.5 | 2.4 | 67 | 0.4 |
| Comparative Examples | 1 | A-1 | 67.5 | 32.5 | 2.8 | 23 | 0.8 |
|  | 2 | A-1 | 65.0 | 35.0 | 2.8 | 67 | 0.4 |
|  | 3 | A-1 | 65.0 | 35.0 | 2.8 | 23 | 0 |

(*1): represents a content (% by mass) in mixed powder.
(*2): represents an amount in terms of carbon (parts by mass) based on 100 parts by mass of mixed powder.
(*3): represents parts by mass based on 100 parts by mass of mixed powder.

TABLE 2

|  |  | Examples | | | | | |
|---|---|---|---|---|---|---|---|
|  |  | 1 | 2 | 3 | 4 | 5 | 6 |
| Ratio [L$_1$/d$_1$] | — | 14 | 14 | 15 | 13 | 17 | 22 |
| Tap density | [g/cm$^3$] | 0.81 | 0.82 | 0.84 | 0.85 | 0.81 | 0.82 |
| BET specific surface area | [m$^2$/g] | 3.8 | 3.9 | 4.3 | 4.1 | 4.0 | 3.9 |
| First peak height (H$_A$) | [%] | 4.2 | 3.8 | 3.8 | 4.7 | 3.9 | 7.4 |
| Second peak height (H$_B$) | [%] | 2.9 | 3.3 | 2.9 | 2.7 | 3.0 | 1.4 |
| Peak height ratio [(H$_B$)/(H$_A$)] | — | 0.67 | 0.87 | 0.76 | 0.57 | 0.76 | 0.19 |
| First peak top (T$_A$) | [μm] | 81 | 81 | 68 | 88 | 81 | 96 |
| Second peak top (T$_B$) | [μm] | 13 | 13 | 14 | 13 | 14 | 13 |
| Difference between peak tops (T$_A$ − T$_B$) | [μm] | 68 | 68 | 54 | 75 | 67 | 83 |
| Particle size at valley between peaks | [μm] | 31 | 34 | 31 | 31 | 34 | 31 |
| Peak decrease rate | [%] | 48 | 51 | 38 | 48 | 47 | 37 |
| Crystallite size | [Å] | 383 | 344 | 402 | 406 | 391 | 404 |
| Average longer diameter of primary particles (L$_1$) | [μm] | 6 | 7 | 7 | 5 | 6 | 7 |
| B$_2$O$_3$ content | [% by mass] | 0.04 | 0.04 | 0.04 | 0.04 | 0.07 | 0.03 |
| CaO content | [% by mass] | <0.01 | <0.01 | 0.01 | <0.01 | 0.01 | <0.01 |
| Carbon content | [% by mass] | 0.01 | 0.01 | 0.02 | 0.01 | 0.01 | 0.01 |
| Purity | [% by mass] | 99.9 | 99.9 | 99.9 | 99.9 | 99.9 | 99.9 |
| Thermal conductivity | [W/mK] | 12 | 13 | 14 | 12 | 12 | 15 |
| Specific gravity rate | [%] | 93 | 93 | 96 | 94 | 97 | 95 |
| Withstand voltage evaluation | — | B | B | A | B | A++ | B |

TABLE 3

|  |  | Comparative Examples | | |
|---|---|---|---|---|
|  |  | 1 | 2 | 3 |
| Ratio [L$_1$/d$_1$] | — | 20 | 13 | 14 |
| Tap density | [g/cm$^3$] | 0.69 | 0.79 | 0.79 |
| BET specific surface area | [m$^2$/g] | 3.3 | 3.4 | 4.4 |
| First peak height (H$_A$) | [%] | 2.4 | 3.7 | 3.9 |
| Second peak height (H$_B$) | [%] | 4.7 | 3.5 | 2.9 |
| Peak height ratio [(H$_B$)/(H$_A$)] | — | 2.00 | 0.96 | 0.75 |
| First peak top (T$_A$) | [μm] | 68 | 88 | 74 |
| Second peak top (T$_B$) | [μm] | 14 | 12 | 13 |

TABLE 3-continued

|  |  | Comparative Examples | | |
|---|---|---|---|---|
|  |  | 1 | 2 | 3 |
| Difference between peak tops ($T_A - T_B$) | [μm] | 54 | 76 | 61 |
| Particle size at valley between peaks | [μm] | 37 | 34 | 31 |
| Peak decrease rate | [%] | 66 | 54 | 39 |
| Crystallite size | [Å] | 375 | 385 | 389 |
| Average longer diameter of primary particles ($L_1$) | [μm] | 8 | 6 | 4 |
| $B_2O_3$ content | [% by mass] | 0.04 | 0.09 | 0.04 |
| CaO content | [% by mass] | <0.01 | 0.01 | <0.01 |
| Carbon content | [% by mass] | 0.02 | <0.01 | 0.01 |
| Purity | [% by mass] | 99.9 | 99.8 | 99.9 |
| Thermal conductivity | [W/mK] | 10 | 11 | 11 |
| Specific gravity rate | [%] | 96 | 96 | 91 |

From Tables 2 and 3, for all the hBN powders of Examples 1 to 6, the purity is higher, and the thermal conductivity of the resin sheet is higher than for the hBN powders of Comparative Examples 1 to 3 even though the ratio of the average longer diameter ($L_1$) to the average thickness ($d_1$) of the primary particles of the hBN, [$L_1/d_1$], is large. Also, it is understood that the hBN powders of Examples 1 to 6 are excellent in the withstand voltage property and therefore exhibit excellent thermal conductive properties and a high level of electric insulation.

It is considered that this is because the peak height ratio is 0.90 or less, the tap density is 0.80 g/cm³ or more, and the BET specific surface area is less than 5.0 m²/g in Examples 1 to 6, so that the dense and strong aggregate is formed and the aggregate is hard to disintegrate, compared with Comparative Examples 1 to 3.

Therefore, it is considered that in the hBN powders of Examples 1 to 6, the aggregate can maintain a dense granular shape without disintegrating in the process of forming a composite with a resin in molding the resin composition comprising the hBN powder into the resin sheet even though the hBN powders comprise the aggregate comprising the primary particles which have a large ratio of the average longer diameter ($L_1$) to the average thickness ($d_1$), [$L_1/d_1$].

Therefore, it is considered that also, in the obtained resin sheets, the primary particles of hBN can maintain the random orientation as shown in FIG. 7 and further the amount of the resin which is taken in the granules is reduced, so that the excellent thermal conductive properties and electric insulation can be exhibited.

This is also understood from the fact that in the hBN powder of Example 1 shown in FIG. 3, the aggregate has the dense granular shape in which the primary particles randomly orientate while the aggregate comprises the primary particles having a larger ratio of the average longer diameter ($L_1$) to the average thickness ($d_1$), [$L_1/d_1$], than in the hBN powder of Comparative Example 1 shown in FIG. 4

The invention claimed is:

1. A hexagonal boron nitride powder comprising an aggregate of primary particles of hexagonal boron nitride, wherein
   the powder has a ratio of an average longer diameter ($L_1$) to an average thickness ($d_1$) of the primary particles, [$L_1/d_1$], of 10 or more and 25 or less, a tap density of 0.80 g/cm³ or more, and a BET specific surface area of less than 5.0 m²/g,
   a particle size distribution curve showing a frequency distribution based on volume of the hexagonal boron nitride powder is a bimodal distribution curve having a first peak in a range of a particle diameter of 500 μm or less and a second peak existing on a smaller particle size side of the first peak, and
   a peak height ratio of a height of the second peak ($H_B$) to a height of the first peak ($H_A$), [($H_B$)/($H_A$)], is 0.90 or less.

2. The hexagonal boron nitride powder according to claim 1, wherein the powder has one maximum peak in a range of a particle size of 45 μm or more and 150 μm or less in a particle size distribution curve showing a frequency distribution based on volume of a hexagonal boron nitride powder classified to have a particle size of 45 μm or more and 95 μm or less, and has a decrease rate of the maximum peak of 35% or more and 70% or less when a dispersion liquid obtained by dispersing the classified hexagonal boron nitride powder in water is subjected to an ultrasonic treatment for 1 minute, the peak decrease rate being calculated by the following expression (1):

Peak decrease rate=[(maximum peak height before treatment (a))−(maximum peak height after treatment (b))]×100/(maximum peak height before treatment (a)) (1).

3. The hexagonal boron nitride powder according to claim 1, having a crystallite size of 260 Å or more and 1000 Å or less.

4. The hexagonal boron nitride powder according to claim 1, wherein the average longer diameter ($L_1$) of the primary particles is 0.5 μm or more and 20 μm or less.

5. A resin composition comprising 10% by volume or more and 90% by volume or less of the hexagonal boron nitride powder according to claim 1.

6. A method for producing the hexagonal boron nitride powder according to claim 1, the method comprising a step of mixing 100 parts by mass of a mixed powder comprising 50% by mass or more and 90% by mass or less of a boron nitride fine powder (A) and 10% by mass or more and 50% by mass or less of a boron compound (B) represented by a composition formula $B_2O_{(3+X)}H_{2X}$ wherein X=0 to 3, 1.0 part by mass or more and 20 parts by mass or less in terms of carbon of a carbon source (C), and 0.01 parts by mass or more and 5.0 parts by mass or less of a calcium compound (D), molding a resultant mixture, and then firing a resultant under an atmosphere comprising a nitrogen gas, wherein
   the boron nitride fine powder (A) has a ratio of an average longer diameter ($L_2$) to an average thickness ($d_2$) of primary particles thereof, [$L_2/d_2$], of 2.0 or more and 15 or less, a 50% volume cumulative particle size $D_{50}$ of 0.20 μm or more and 5.0 μm or less, a BET specific surface area of 5.0 m²/g or more and 30 m²/g or less, and a crystallite size of 150 Å or more and 400 Å or less.

7. The method for producing the hexagonal boron nitride powder according to claim 6, wherein the carbon source (C) is at least one selected from the group consisting of graphite and boron carbide.

8. The method for producing the hexagonal boron nitride powder according to claim 6, wherein the carbon source (C) is boron carbide, and the boron carbide has a 50% volume cumulative particle size $D_{50}$ of 1.0 μm or more and 200 μm or less.

* * * * *